APPARATUS FOR TAPE RECORDING INFORMATION

Filed April 7, 1964 11 Sheets-Sheet 1

INVENTORS
ROBERT Z. HAGUE
HOWARD H. LAUCKS
GEORGE J. LOOS
BY Popp and Sommer
ATTORNEYS

APPARATUS FOR TAPE RECORDING INFORMATION

Filed April 7, 1964 11 Sheets-Sheet 2

INVENTORS
ROBERT Z. HAGUE
HOWARD H. LAUCKS
BY GEORGE J. LOOS

Popp and Sommer
ATTORNEYS

Jan. 17, 1967 R. Z. HAGUE ETAL 3,298,603

APPARATUS FOR TAPE RECORDING INFORMATION

Filed April 7, 1964 11 Sheets-Sheet 3

INVENTORS
ROBERT Z. HAGUE
HOWARD H. LAUCKS
GEORGE J. LOOS

BY Popp and Sommer
ATTORNEYS

APPARATUS FOR TAPE RECORDING INFORMATION

Filed April 7, 1964 11 Sheets-Sheet 4

INVENTORS
ROBERT Z. HAGUE
HOWARD H. LAUCKS
GEORGE J. LOOS
BY Popp and Sommer
ATTORNEYS

APPARATUS FOR TAPE RECORDING INFORMATION

INVENTORS
ROBERT Z. HAGUE
HOWARD H. LAUCKS
GEORGE J. LOOS
BY Popp and Sommer
ATTORNEYS INVENTORS
ROBERT Z. HAGUE
HOWARD H. LAUCKS
GEORGE J. LOOS
BY Popp and Sommer
ATTORNEYS

APPARATUS FOR TAPE RECORDING INFORMATION

Filed April 7, 1964 11 Sheets-Sheet 7

INVENTORS
ROBERT Z. HAGUE
HOWARD H. LAUCKS
GEORGE J. LOOS
BY Popp and Sommer
ATTORNEYS Jan. 17, 1967 R. Z. HAGUE ETAL 3,298,603

APPARATUS FOR TAPE RECORDING INFORMATION

Filed April 7, 1964 11 Sheets-Sheet 8

INVENTORS
ROBERT Z. HAGUE
HOWARD H. LAUCKS
BY GEORGE J. LOOS
Popp and Sommer
ATTORNEYS

APPARATUS FOR TAPE RECORDING INFORMATION

Filed April 7, 1964 11 Sheets-Sheet 9

INVENTORS
ROBERT Z. HAGUE
HOWARD H. LAUCKS
GEORGE J. LOOS
BY Popp and Sommer
ATTORNEYS INVENTORS
ROBERT Z. HAGUE
HOWARD H. LAUCKS
BY GEORGE J. LOOS
Popp and Sommer
ATTORNEYS

APPARATUS FOR TAPE RECORDING INFORMATION

Filed April 7, 1964 11 Sheets-Sheet 11

INVENTORS
ROBERT Z. HAGUE
HOWARD H. LAUCKS
GEORGE J. LOOS
BY Popp and Sommer
ATTORNEYS United States Patent Office 3,298,603 Patented Jan. 17, 1967

3,298,603

APPARATUS FOR TAPE RECORDING INFORMATION

Robert Z. Hague, Oradell, Howard H. Laucks, Oakland, and George J. Loos, Fort Lee, N.J., assignors to Moog, Inc., a corporation of New York Filed Apr. 7, 1964, Ser. No. 357,962
12 Claims. (Cl. 234—114)

This invention relates to improvements in apparatus for tape recording information, and more particularly to apparatus for punching tape with encoded information used for the numerical control of a machine tool.

With standard type punching equipment such as a tape-producing typewriter, it is necessary for a programmer to prepare detailed program sheets, filling in complete location information, tool change information and sequence number for each tool to be used. These sheets are then given to a tape-punching typewriter operator. Because of the amount of information required in these program sheets, errors frequently occur, causing costly delays in part production. With such standard tape production practices an error in the tape requires that the programmer make the corrections on the program sheets. The tape production sequence is then repeated.

An important object of the present invention is to provide tape punch apparatus which enables the operator of a machine tool to produce the punched tape right at the machine, thus reducing the labor to program a part to be machined and providing faster and simpler programming by minimizing the time interval between the blueprint reading stage and the completion of the machining operations on the part. All that the operator needs is a list of all locations where machining operations such as drilling or boring are to take place, such locations being represented by coordinates along X and Y axes.

Another object is to provide such apparatus which permits a final tape to be prepared by first feeding a location tape into the machine tool positioner on which location tape are represented the coordinates of all hole locations. This location tape is fed through the tape reader to control the position of the workpiece while the operator machines the part, simultaneously producing the final tape that runs the machine automatically in future cycles by manually controlling the addition of further encoded information. This is of great advantage where a large number of holes are to be drilled or bored.

Another object is to provide such apparatus which enables the operator to verify each location and to check out tool information before punching the tape to produce the final tape. Errors in the tape are thus less likely to occur.

A further object is to provide such apparatus which enables a duplicate tape to be punched while a part is being produced from the original tape.

Another object is to provide such apparatus which permits location information to be added or omitted so as to produce desired variations in part design without changing the original tape, the new location information being controlled manually and punched in a new tape.

Another object is to provide such apparatus with an associated add-function device which is particularly useful for machining multiple parts. The operator can set this device to duplicate the tape-directed operations at certain steps, say steps of 5, 10 and 15 inches in the X direction and 5 inches in the Y direction. Thus a considerable number of parts can be machined using the same tape. This minimizes the information which the operator feeds into the control, further reducing the chance for human error. Also, less operator time is required.

Another object is to provide such apparatus which is simple and less expensive than more complex tape-producing equipment such as tape-punching typewriters.

Other objects and advantages of the invention will be apparent from the following detailed description of a preferred embodiment thereof illustrated in the accompanying drawings in which.

GENERAL DESCRIPTION

Figure 1:
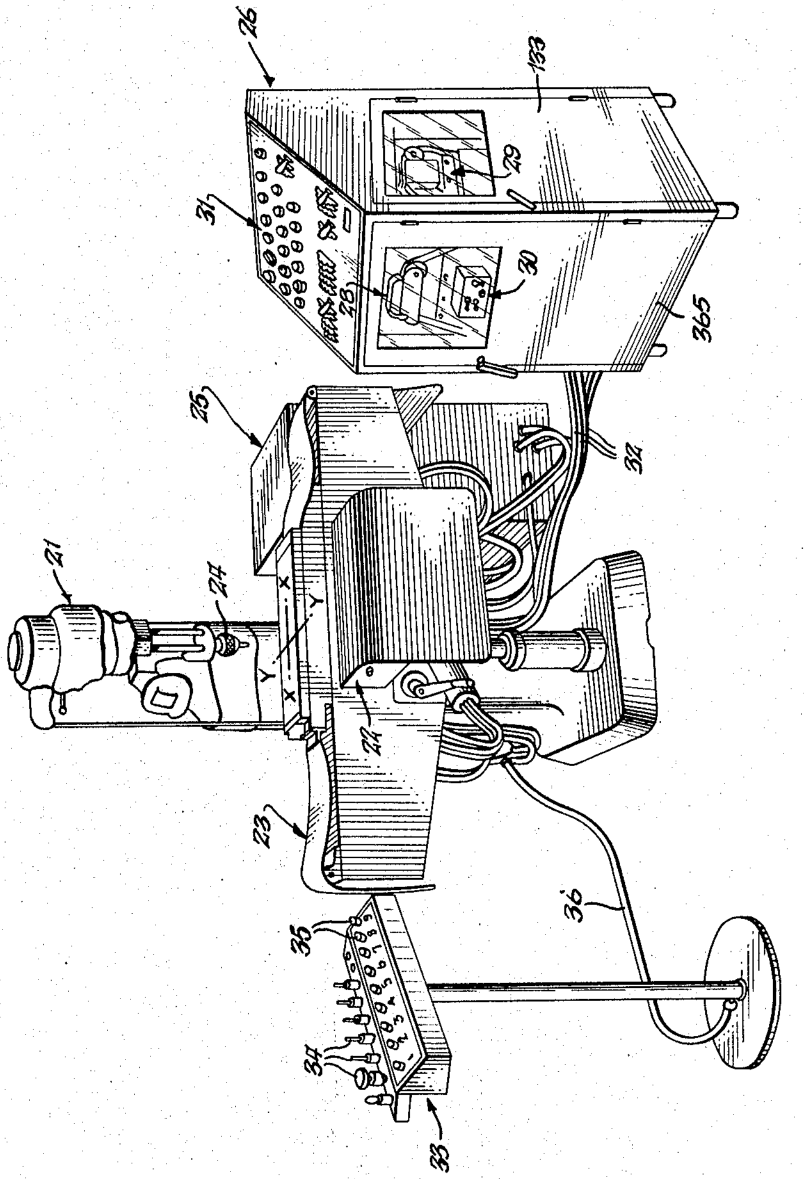
FIG. 1 is a perspective view of a machine tool provided with numerical control positioning apparatus and associated equipment including a control console in which the tape punch device of the present invention is arranged.

Referring to FIG. 1, the numeral 21 represents a machine tool such as a drill press or boring machine. This machine is equipped with numerical control positioning apparatus including means indicated generally at 22 for moving a saddle along a fore and aft or Y-axis, and means indicated generally at 23 for moving a table relative to the saddle along a perpendicular lateral or X-axis. It is on this table that a workpiece (not shown) is suitably fastened for movement relative to the vertically disposed spindle 24 of the machine tool. The positioning means 22 and 23 are hydraulic devices well-known to those skilled in the art. The numeral 25 represents a cabinet housing the pressurized hydraulic supply means for the positioning means 22 and 23.

Operatively associated with the positioning means 22, 23 is a control console indicated generally at 26. This console is shown as including a tape reader indicated generally at 28, a tape punch device embodying the present invention and indicated generally at 29, an add-function device indicated generally at 30, and has a control panel indicated generally at 31. Several conduits 32 are shown as extending from the control console 26 to the machine tool 21 and these house pneumatic lines for operating in some cases pneumatic-hydraulic transducers forming part of the positioning means 22, 23.

The numeral 33 represents generally a tool stand which is positioned adjacent the machine tool 21 and holds various tools such as indicated at 34 located at numbered stations at which electric lamps 35 are severally arranged. A conduit 36 leads from the tool stand 33 to the machine tool and houses the necessary control lines for operating the lamps 35. The tools 34 are adapted to be manually placed in the chuck of the tool spindle 24.

Figure 3:
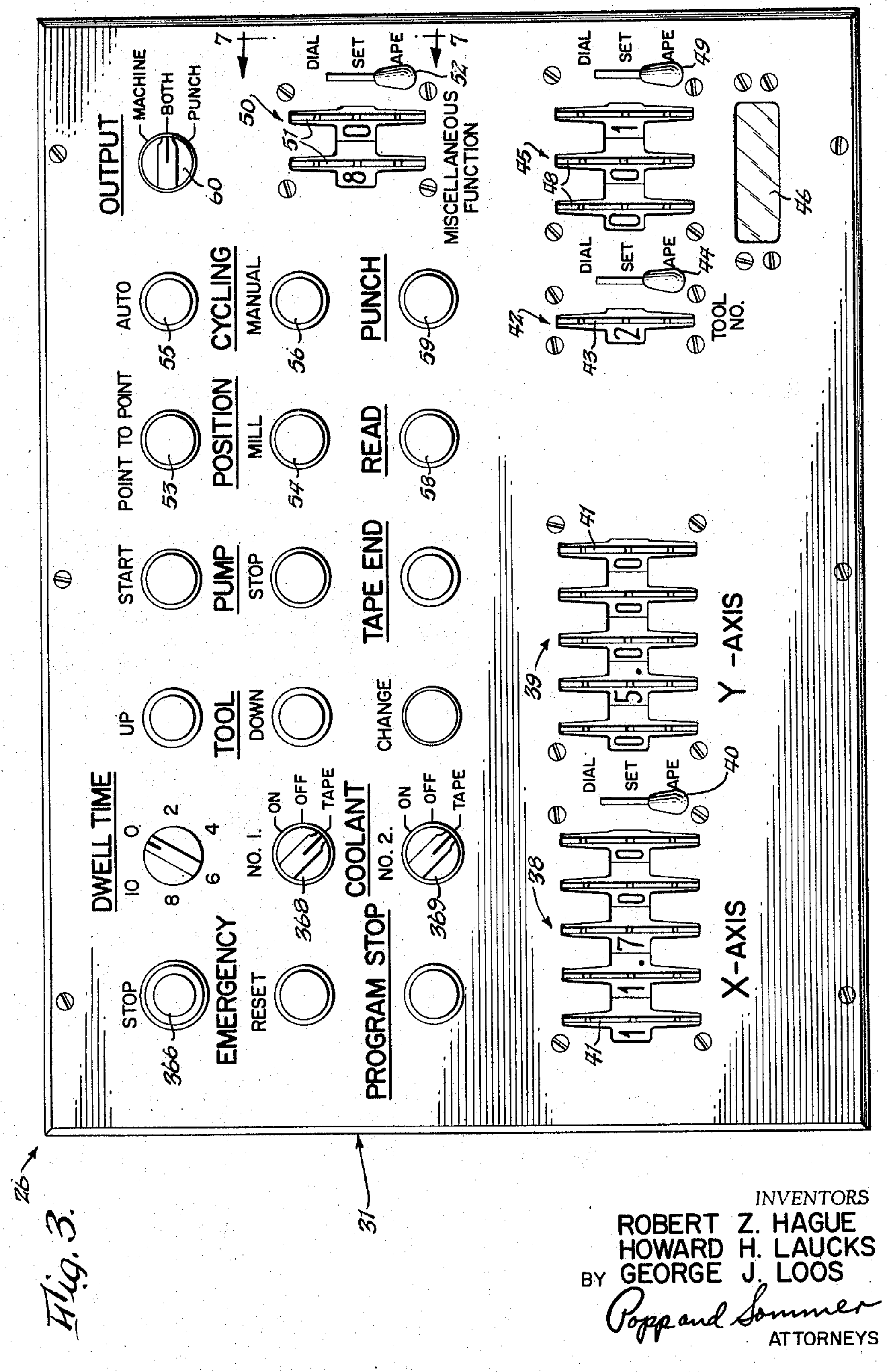
FIG. 3 is a top plan view of the control panel of the console shown in FIG. 1.

In FIG. 3 the control panel 31 of the console 26 is illustrated in top plan. This panel contains controls only some of which need be explained in connection with an understanding of the present invention. Thus the numeral 38 represents generally manual control means for determining numerical control commands for the X-axis. The numeral 39 represents similar manual control means associated with the Y-axis. Associated with such means 38 and 39 is a manually operated lever 40 which determines the mode of the control means 38 and 39. As shown the mode selector lever 40 is in a "tape" reading position. It may also be placed in a central position designated "set" permitting dimension information to be manually set by manipulating dials, and a remotely placed position designated "dial" which renders the manually set information effective.

Each of the means 38 and 39 includes five dial members individually indicated at 41. Each of these dial members is arranged for rotation about a horizontal axis and carries digits from 0 through 9 at circumferentially spaced intervals. As illustrated and reading from left to right, the dial members 41 for the X-axis control the tens, units, tenths, hundreds and thousandths of a dimension in inches. Also as illustrated and reading from left to right, the dial members 41 for the Y-axis control tens, units, tenths, hundredths, and thousandths of a dimension in inches, although in the particular embodiment illustrated the tens digit is not utilized for the Y-axis.

The numeral 42 represents generally a manual control means provided for determining the number of a tool 34 to be used during a particular machining operation. Since there are only nine stations provided on the tool stand 33 shown in FIG. 1 only a unit number needs to be represented and therefore only one dial member 43 is provided. Included as part of the manual control means 42 is a mode selector lever 44 having three positions similar to those described for lever 40.

The numeral 45 represents generally a manual control means for controlling the display of digits on a viewing screen 46 and indicating the sequence number of a particular machining operation. Three digits are allocated for representing sequence number and the means 45, therefore, includes three dial members 48. This means 45 also includes a mode selector lever 49 having three positions similar to those described for lever 40.

The numeral 50 represents generally another manual control means for indicating a miscellaneous function to be performed. Various combinations of two digits may represent various miscellaneous functions according to a predetermined code. For example 00 may represent program stop; 02 end of program; 06 tool change; 07 coolant on #2; 08 coolant on #1; 09 coolant off; 20 double advance; and 80 no change in miscellaneous function. Accordingly, only two dial members 51 need be included in the manual control means 50 which also includes a mode selector lever 52 having three positions similar to those described for lever 40.

Still referring to FIG. 3, the console control panel 31 is shown as including two push buttons 53 and 54 respectively designated "point-to-point" and "mill" which control the mode of operation of the positioning means 22 and 23. There are also provided two push button switches 55 and 56 to control respectively "automatic" and "manual" cycling of the machine control. The numeral 58 represents another push button switch designated "read" which when depressed causes a tape to be read by the reader 28, and the numeral 59 represents another push button switch designated "punch" which when depressed causes a tape to be punched by the device 29. The various push buttons 53–59 are of the type which illuminate.

The numeral 60 represents a knob which selectively determines the output of the control consoled. This knob has three positions designated respectively "machine," "punch" and "both".

Figure 7:
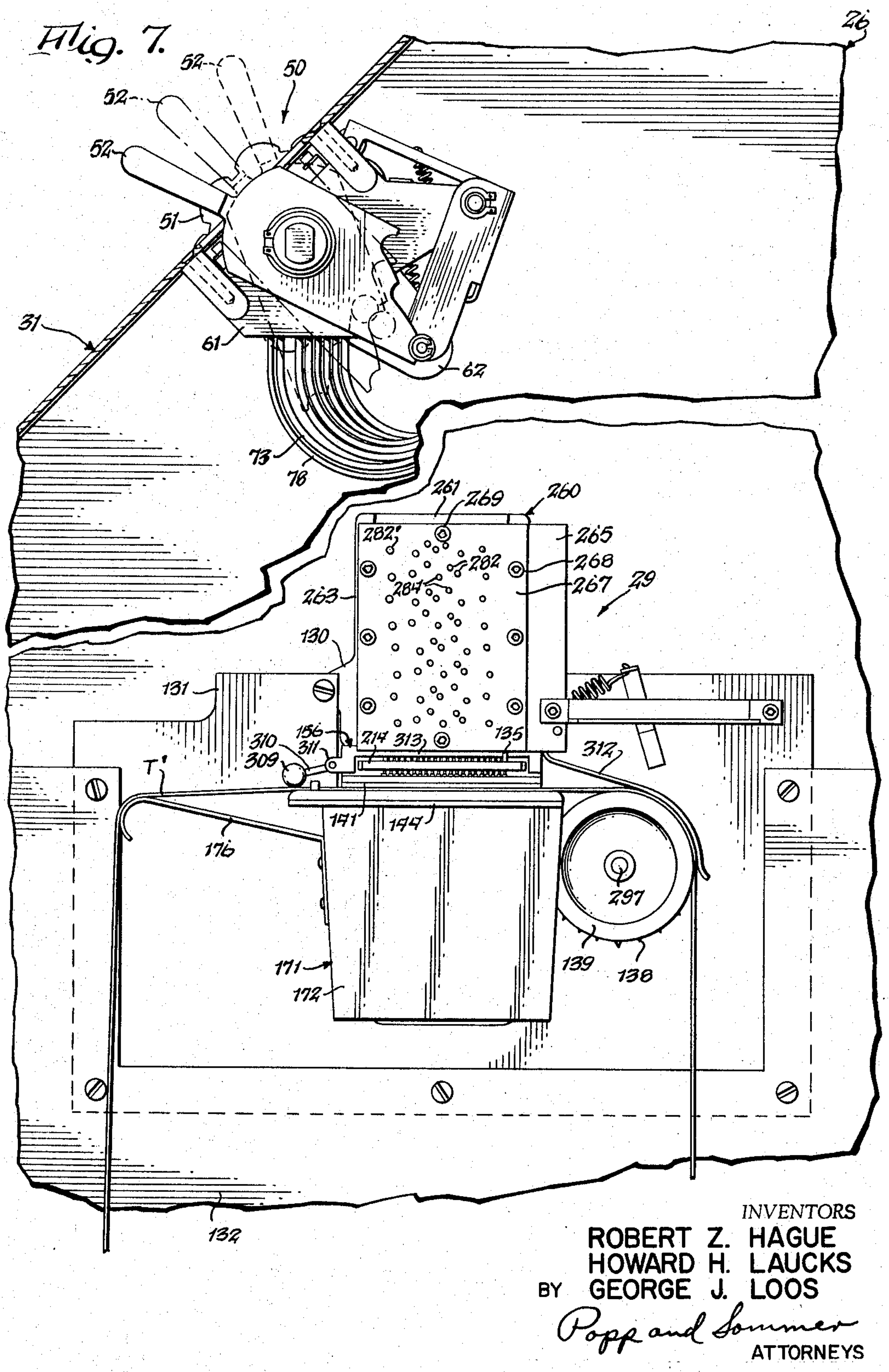
FIG. 7 is an enlarged fragmentary vertical sectional view of the console and showing the outer or front side of the tape punch device in elevation and also showing in elevation the outer end of an adjacent manual control assembly, this view being taken generally on line 7—7 of FIG. 3.

The various manual control means 38, 39, 42, 45 and 50 are similar in construction except that they vary as to the number of dial members included. Except for this deviation, therefore, the dial members 41, 43, 48 and 51 are similar, as are also the mode selector levers 40, 44, 49 and 52. Although the various manual control means form no part of the present invention and are well-known to those skilled in the art, the manual control means 50 is illustrated in FIG. 7 in elevation as viewed from one end thereof and is representative of the other manual control means 38, 39, 42 and 45. It will be briefly described in connection with the developed diagrammatic view thereof illustrated in FIGS. 4 and 5.

Figure 4:
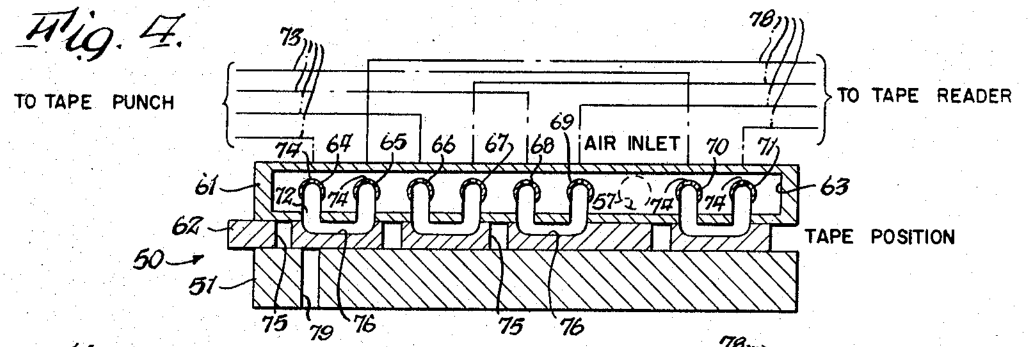
FIG. 4 is a developed diagrammatic view of manual control means which are associated with the inventive tape punch device and showing such means arranged in a tape reading position.
Figure 5:
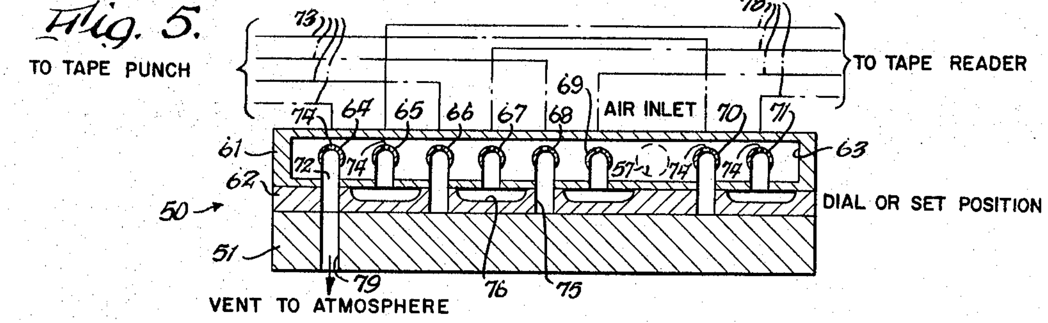
FIG. 5 is a view similar to FIG. 4 but showing the manual control means arranged for dial or set position.

Accordingly, referring to FIGS. 4, 5 and 7, the representative manual control means 50 is shown as including a housing member 61 for each dial member 51 and an intermediate mode member 62. The housing member 61 is shown in FIGS. 4 and 5 as provided with a plenum chamber 63 supplied with air under pressure through an inlet 57 and having eight tubes 64–71 arranged therein, these tubes leading severally to ports provided in one side wall of the member 61 such as indicated at 72 for the tube 64. Tubes 64, 66, 68 and 70 at the end remote from their respective ports 72 lead by tubing designated 73 in FIG. 7 and by lines bearing the same numeral in FIG. 4, to the tape punch device 29. Each of tubes 64–71 is shown as having a restricted orifice 74 therein which establishes communication with chamber 63.

Mode member 62 can be shifted relative to housing member 61, this being achieved by manipulating lever 52. Mode member 62 is shown as having a series of through holes individually represented at 75 and a series of adjacent channels 76 in like number. As shown in FIG. 4 which represents mode member 62 in "tape" position, determined by lever 52 being in the full line position depicted in FIG. 7, the various channels 76 will establish communication between the corresponding pairs of adjacent tubes 64–71. Thus tubes 64 and 65 are joined, as are tubes 66 and 67, tubes 68 and 69, and tubes 70 and 71. The other ends of tubes 65, 67, 69 and 71 are connected to tape reader 28 by tubing 78 shown in FIG. 7 and represented by lines bearing the same numeral in FIG. 4.

Dial member 51 has a series of through holes 79 only one of which is illustrated in FIGS. 4 and 5. Such holes 79 are provided according to a binary code. When mode member 62 is in the "tape" position depicted in FIG. 4, holes 79 are blocked as shown. However, after mode member 62 has been shifted by manipulation of lever 52 to either the "dial" or "set" position, depicted respectively by broken lines and dot-dash lines in FIG. 7, holes 75 in the mode member are placed in registry with ports 72 and also in registry with holes 79 as they exist. Whether holes 79 exist or not and their location depends upon the particular setting of the dial member and this in turn depends upon the digit desired to be represented by the particular position of such dial member.

The digit represented by the setting of a particular dial member such as one of the dial members 51 produces binary encoded signals in the punch conduits 73, if the mode selector lever 52 is in the "dial" or "set" position as depicted in FIG. 5. Actually air will not be supplied to plenum chamber 63 until lever 52 is in the "dial" position whereupon air under pressure from a suitable source is supplied to this chamber. However, insofar as the relative positions of the mode member 62 and the corresponding housing member 61 and dial member 51 are concerned, the mode member will be in the relative position depicted in FIG. 5 when lever 52 is either in the "dial" or "set" position. When this lever 52 is shifted to the "tape" position it will be seen from FIG. 4 that channels 76 will connect corresponding pairs of tubes such as 64 and 65 so that the tape reader signal conduits 78 are placed in communication with the tape punch signal conduits 73.

Figure 2:
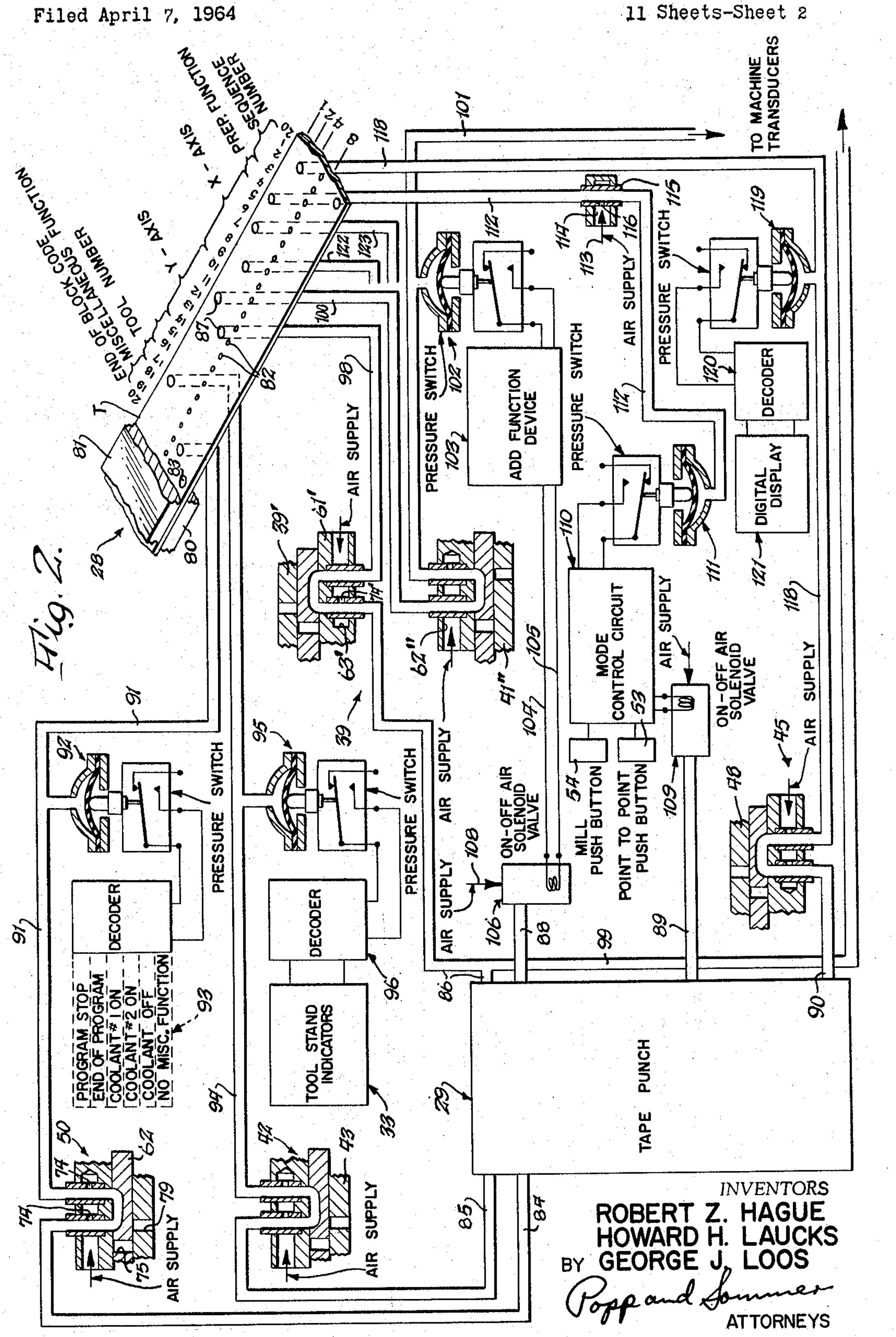
FIG. 2 is a schematic view of the tape punch device and associated control means constructed in accordance with the principles of the present invention.

Referring now to the tape reader 28, this device per se is well known to those skilled in the art, forms no part of the present invention and therefore has not been illustrated in detail. It will be sufficient to explain, as schematically depicted in FIG. 2, that the tape reader 28 includes a lower reader head 80 and an upper reader head 81. These heads 80 and 81 are adapted to clamp therebetween a tape T and are provided with ports (not shown) adapted to register severally with holes in the tape which represent binary encoded information.

Referring to tape T shown in FIG. 2, the same includes twenty transverse rows and longitudinally extending tracks including four tracks which according to the binary code represents values respectively of 1, 2, 4 and 8. Between tracks having values 4 and 8 is illustrated a longitudinally running series of uniformly spaced tape drive holes 82. The twenty transverse rows are illustrated as numbered consecutively, rows 1, 2 and 3 being assigned for representing sequence number in three digits; row 4 being assigned for preparatory function which will be a number such as 1 to indicate point-to-point positioning or the number 2 to designate mill positioning to the selected location; rows 5, 6, 7, 8 and 9 being assigned to represent binary encoded dimension information for the X-axis, row 5 being for tens, row 6 for units, row 7 for tenths, row 8 for hundredths, and row 9 for thousandths; rows 10, 11, 12, 13 and 14 being assigned for representing binary encoded dimension information for the Y-axis, row 10 being reserved for tens but not used in the example considered, row 11 for units, row 12 for tenths, row 13 for hundredths, and row 14 for thousandths; rows 15 and 16 being assigned to represent feed function in two digits; row 17 being assigned to represent tool number in one digit; rows 18 and 19 being assigned to represent miscellaneous function in two digits; and row 20 is always punched with a hole 83 at the side of the tape laterally remote from the binary encoded holes such as shown at 87 to represent the end of the block of coded information and receives a sprocket pin on the tape reader 28 properly to locate the tape when being read. Any unused tracks between the end of block code hole 83 in row 20 and the first four tracks having values 1, 2, 4 and 8 may be provided with coded holes to represent other information for use in more complex machines.

One of the main features of the present invention is to provide punched tape which is either a duplicate of an existing tape or which utilizes some of the information on the existing tape with other information being manually put in so that the new tape produced may be different from the original tape.

Referring to FIG. 2, the tape punch device 29 is represented diagrammatically as a block and is shown as having a series of punch pneumatic signal conduits leading thereto, six such conduits being illustrated and designated respectively 84, 85, 86, 88, 89 and 90. While the detailed description of the construction and operation of the tape punch device 29 will be given later herein, it is here pointed out generally that if the new tape to be punched is to be a duplicate of the existing tape T, wherever there exists a hole in a given row of tape T a similar hole will be punched in the corresponding row in the new tape.

Punch signal conduit 84 is shown as leading to the manual control means 50 to which is also connected a reader signal conduit 91. Such conduit 91 is shown as communicating with a hole in row 19 and provided in the track having a value 8. It will be understood that for such row 19 there will be three more reader signal conduits like conduit 91 leading to the manual control means 50, and that there will be three additional punch signal conduits like conduit 84 leading from the manual control means 50 to the tape punch device 29. For simplicity, only one such corresponding pair of conduits 84 and 91 is illustrated in FIG. 2.

The manual control means 50 shown in FIG. 2 is similar to that described in connection with FIGS. 4 and 5. As illustrated in FIG. 2, the manual control means 50 is in the "tape" position so that conduits 84 and 91 communicate with each other. Thus if there is no pressure in tape reader conduit 91 because the hole in tape row 19 associated with such conduit 91 vents such conduit to the atmosphere, pressure cannot obtain within this conduit and since it is in communication with the corresponding punch signal conduit 84, the latter will also be under no pressure. This affects the operation of the corresponding punch of the tape punch device 29 as will be explained later herein. It will also be seen that if there were no hole in tape row 19 associated with the particular reader signal conduit 91 illustrated in FIG. 2, a positive pressure would obtain within such conduit and also in punch conduit 84. It will be understood that the supply of pressurized air for the conduits 91 and 84 is provided from the plenum chamber of the manual control means 50.

If, on the other hand, mode member 62 of the manual control means 50 is shifted to the right as viewed in FIG. 2 to the "dial" or "set" position corresponding to FIG. 5, each hole 75 will register with a vent hole 79 if one exists in the dial member for the particular digit represented as determined by the angular position of such dial member. If, for example, holes 75 and 79 register with the port at the end of punch conduit 84, it will be seen that such conduit will be vented to the atmosphere so that no pressure will develop in this conduit. However, pressure is still maintainable in reader signal conduit 91 provided no hole exists in the tap for the corresponding conduit The pressure in reader signal conduit 91 is sensed by a pressure switch represented generally at 92 which may be of any suitable construction. This pressure switch 92 is operatively associated with a decoder mechanism indicated generally at 93. Thus the coded pressure signals severally in four conduits like 91 will cause miscellaneous functions to occur as commanded, such functions being of the type previously mentioned and noted in FIG. 2. It will be understood that there will be a pressure switch 92 in each of the conduits 91.

Punch signal conduit 85 is operatively associated with manual control means 42 with which is also operatively associated a reader signal conduit 94. This conduit 94 is shown as leading to a hole in row 17 of the tape T, such row being allocated for designation of tool number. Manual control means 42 operates in a manner similar to that described herein before with respect to manual control means 50. The only difference is that the means 42 has only one dial member 43 inasmuch as only tape row 17 is involved in connection with the indication of tool number. It will be appreciated that there are four reader signal conduits like 94 and also four punch signal conduits like 85, all being operatively associated with the manual control means 42. Arranged in each reader signal conduit 94 is a pressure switch indicated generally at 95. This pressure switch may be of any suitable construction and is operatively arranged with a decoder indicated generally at 96 which in turn controls the illumination of the appropriate one of tool indicator lamps 35 arranged on tool stand 33. Illumination of such a lamp 35 indicates to the machine tool operator that the tool positioned opposite such lamp is the tool to be placed in the spindle 24. It will also be appreciated that the tool number is represented by a binary encoded information in the form of pressures or the absence of pressures severally in the various reader signal conduits 94, pressure being determined in a given conduit by the absence of a hole in tape row 17 and no pressure being determined by the presence of a hole.

Punch signal conduit 86 is shown as operatively associated with dial member 39′ of manual control means 39. This dial member 39′ is also operatively associated with a reader signal conduit 98 which is shown as leading to a hole in the track having the value 4 and disposed in tape row 12. Thus dial member 39′ controls tenths for the Y-axis dimension. It will be understood that there will be a total of four lines like conduit 98 and also four lines like conduit 86 operatively associated with dial member 39′.

A similar set of four pairs of conduits (not shown) will be associated with tape row 13 and another dial member of the manual control means 39 for commanding the desired number in hundredths. A still further set of four pairs of conduits (not shown) will be provided for tape row 14 and associated with still another dial member of the manual control means 39. It will be noted that punch conduit 86 communicates with plenum chamber 63′ through orifice 74′ but no such orifice exists in the connection of reader conduit 98 with housing member 61′.

It will be noted further that punch conduit 86 has connected thereto a branch conduit 99 which leads to the pneumatic-hydraulic transducer (not shown) of the positioning means 22. Such a branch line exists for all of punch conduits like 86 serving rows 12, 13 and 14 of the tape T.

Inasmuch as one of the features is to be able to add some fixed dimensions to units or to tens, any hole in tape rows 10 and 11 are handled in a different manner from that described in connection with tape rows 13 and 14. A hole in the track having a value of 1 is shown in tape row 11. This is shown as communicating with a reader signal conduit 100 which at its remote end is also operatively associated with the manual control means 39, in particular with another dial member 41″ thereof. This conduit 100 like conduit 98 has no fluid communication directly with plenum chamber 62″. Also operatively associated with dial member 41″ is a pneumatic signal conduit 101 which leads to a pneumatic-hydraulic transducer (not shown) which controls positioning means 22 for the Y-axis. Sensing the pressure in this conduit 101 is a pressure switch designated generally at 102. This switch may be of any suitable construction and is shown as operatively associated with an add-function device represented generally by the numeral 103. This device 103 is shown as controlling through electrical conductor lines 104 and 105 the energization of an on-off air solenoid valve represented generally at 106. This solenoid valve 106 when off or de-energized blocks communication between punch signal conduit 88 and a suitable air supply represented by the arrow 108. When the solenoid valve is on or energized, communication is established between the pressurized air supply line 108 and punch conduit 88 so as to establish pressure in the latter.

The add-function device 103 will be described in detail later herein. For the present it is sufficient to say that this device is associated only with the track values in rows 10 and 11 of the tape T for the Y-axis and in rows 5 and 6 for the X-axis. Four such punch conduits 88 and solenoid valves 106 severally associated therewith are provided for each of tape rows 5, 6, 10 and 11 and a similar number of pairs of conduits 100 and 101 is provided for each of these rows. When the add-function device is not rendered operative, the various solenoids 106 will be deenergized or energized in accordance with the binary encoded information in the reader signal conduits 100. In other words, without the add-function device being rendered operative when a pressure exists in connected lines 100, 101 a pressure will be reproduced in the corresponding punch conduit 88, and vice versa.

Punch signal conduit 89 is shown as being operatively associated with an on-off air solenoid valve represented generally by the numeral 109. The coil of such valve is controlled by a circuit indicated generally at 110 which in turn is controlled by mill push button 54 and point-to-point push button 53. Actuation of the mode control circuit 110 is in turn controlled by a pressure switch indicated generally at 111 and which may be of any suitable construction. This pressure switch 111 senses pressure in a pneumatic signal conduit 112 which is shown as leading to a hole in the tape track having the value 1 provided in row 4. Air under pressure is supplied to conduit 112 from a suitable source represented by the arrow 113 which supplies such air to a plenum chamber 114 traversed by a tube 115 having a restricted aperture 116 therein. Inasmuch as tape row 4 is used to designate preparatory function which is to indicate either point-to-point positioning or milling to a selected location, only two tracks such as the first two tracks having the values of 1 and 2 respectively need be employed. As shown in FIG. 2 a hole in the first track is associated with signal conduit 112. Thus two such conduits will be provided, two pressure switches 111, two on-off air solenoid valves 109, and two punch signal conduits 89. One set of corresponding components indicates a mill mode, and the other set of corresponding components indicates a point-to-point mode.

Punch signal conduit 90 is shown as operatively associated with manual control means 45 which is also operatively associated with one end of a reader signal conduit 118 which at its opposite end leads to the tape T. The manual control means 45 is capable of designating the sequence number using three digits and hence three transverse rows of tape, namely rows 1, 2 and 3, are allocated for this purpose. It will be understood that there will actually be four corresponding pairs of conduits 118 and 90 for each of tape rows 1, 2 and 3. As shown, the reader signal conduit 118 is associated with a hole in tape row 2 having a track value of 2. One one the three dial members 48 will be assigned to each of rows 1, 2 and 3.

Sensing the pressure in each such reader conduits 118 is a pressure switch indicated generally at 119. This switch may be of any suitable construction and is operatively associated with a decoder indicated generally at 120 which causes the appropriate digital display in the window 46 (FIG. 3), effected by any suitable means such as those indicated diagrammatically at 121 in FIG. 2.

It will be noted that all of the manual control means 42, 45 and 50, with the exception of the means 38 and 39 have double orifices such as indicated at 74 in FIG. 4 for the manual control means 50, to supply air to the associated reader and punch signal conduits. In the case of manual control means 38 and 39 which represent the X and Y coordinate information, such means are equipped with but one air supply orifice such as indicated at 74′ in FIG. 2 since the machine tool 21 and tape punch device 29 are the only devices which must receive signals from these conduits.

It will further be noted that in FIG. 2, only two digits of a Y-axis dimension are represented and no digits are represented with associated mechanism for any X-axis dimension except fragmentarily two signal conduits 122 and 123. Conduit 122 would be associated with components similar to those associated with reader signal conduit 98 for a Y-axis dimension. Conduit 123 would be associated with components similar to those associated with reader signal conduit 100 for a Y-axis dimension.

TAPE PUNCH DEVICE (FIGS. 7–19)

The tape punch device 29 includes a frame member 130 preferably a casting which is suitably mounted on a panel 131 in turn suitably mounted on an inner vertical side wall 132 provided in control console 26. Access to the tape punch device 29 is provided by a door 133 in the corresponding side of the console.

Figure 11:
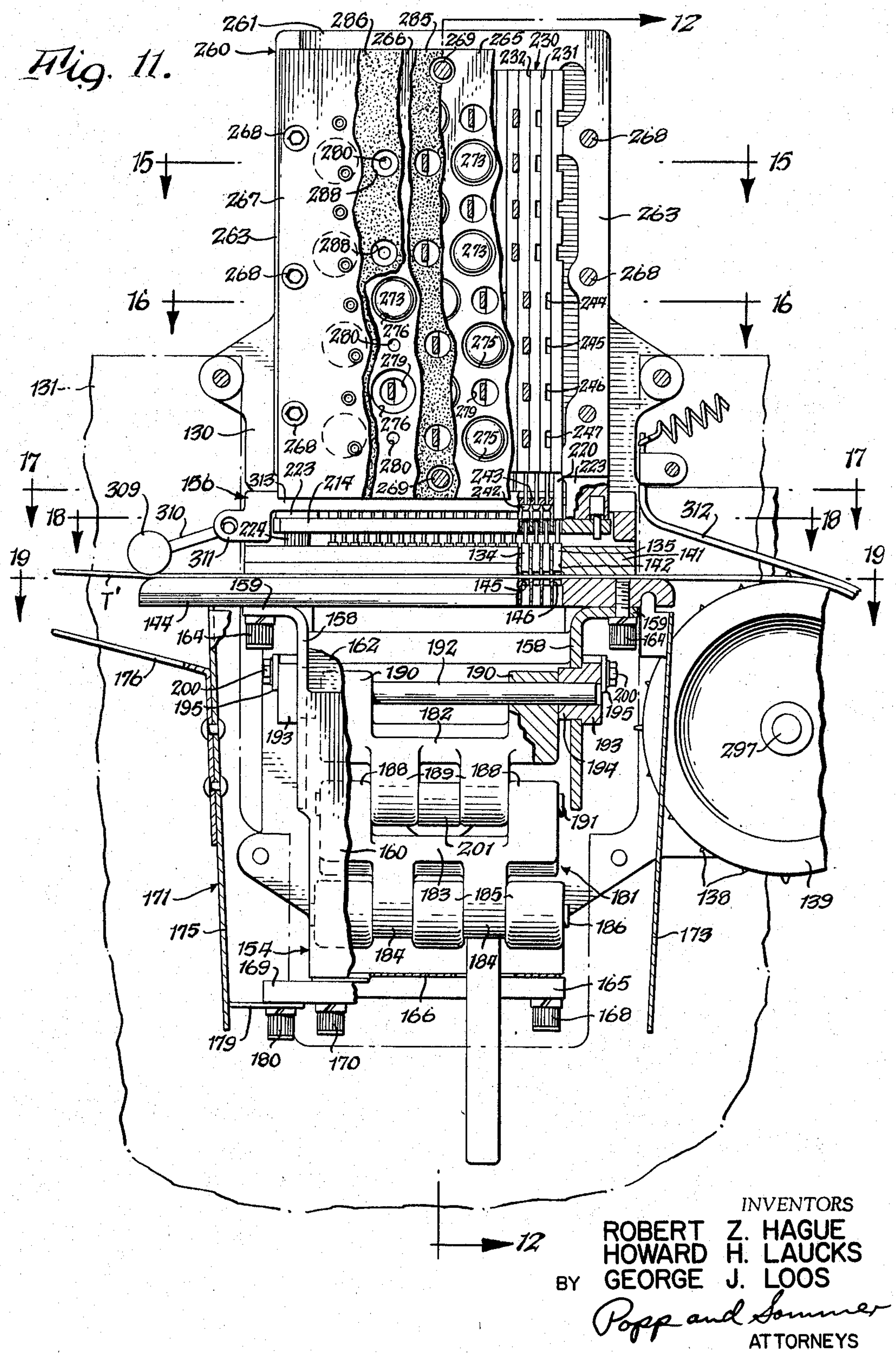
FIG. 11 is an enlarged view of the tape punch device and is similar to FIG. 7 except that portions of the device have been broken away to reveal hidden structure.

The tape punch device induces means for supporting a tape T'. Four punches individually indicated at 134 are provided in a row for each of the nineteen rows provided on the tape T and are adapted to punch holes representing binary encoded information for such rows. Additionally a punch 135 is provided in a separate or twentieth row to make the indexing hole 83 at one side of the tape. Further, there is a longitudinally running row of twenty punches 136 smaller in size and adapted to punch the holes 82 for receiving drive teeth 138 provided on a sprocket wheel 139. The lower portion of each of the binary encoded punches 134 is slidably received in a vertical hole 140 provided in a vertically reciprocable guide plate 141. The indexing hole punch 135 is received in a similar hole 142 provided in the guide plate 141 (FIG. 11). Each of the drive hole punches 136 is arranged in a similar hole 143 provided in guide plate 141. The lower end of each of the punches 134–136 is transversely slanted to facilitate penetration of the tape T' when moved vertically upwardly relative thereto.

Disposed below and opposite the guide plate is a die plate 144 which is provided with a plurality of holes 145 in like number and size to the holes 140 and in vertical registry therewith. The die plate 144 is also provided with a vertical hole 146 in vertical alignment with the indexing punch hole 142 and is of the same diameter. Likewise the die plate 144 has a series of vertical holes 148 in like number and alignment with the drive punch holes 143. The lower end portion of each of the holes 145, 146 and 148 is shown as being enlarged so that the disk of material of which the tape T' is composed such as paper cut out by the various punches may be easily discharged from the corresponding hole when the tape is perforated.

The plates 141 and 144 are maintained in a slightly vertically spaced apart condition corresponding to the vertical thickness of the tape T'. This is achieved by clamping these plates against one end of a generally horizontal flat spring 149. The spring 149 acts as a spacer between the plates 141 and 144 and has an exposed transverse front edge which extends longitudinally of the tracks or longitudinal rows of punches so as to serve generally as a guide surface for the tape T' as it may be moved along the space between the plates 141 and 144. The opposite or rear end of the flat spring 149 is shown as clamped to the frame 130 by a clamping bar 150 secured by two screws 151.

The plates 141 and 144 are clamped against the leaf spring 149 by four screws including two screws 152 which extend through alined vertical holes provided in these elements and a horizontal upper central portion 153 of a die support member generally represented at 154. The upper end of each screw 152 is screwed into an internally threaded hole provided in the rear bar 155 of a generally rectangularly shaped pusher rod extractor frame member represented generally by the numeral 156.

The die support member 154 is shown as having a pair of end walls 158 adjacent its upper part and each of these end walls has an out-turned horizontal flange portion 159. Intermediate the end walls 158 the die support member has a vertical portion 160 which extends downwardly below the end walls 158 terminating in a rearwardly turned horizontal flange portion 161. The upper end of the vertical front wall portion 160 of the die support member is shown as upwardly and inwardly inclined as indicated at 162 to join integrally with the horizontal portion 153 provided between end walls 158. A pair of end screws 163 and each similar to the previous described screws 152 assist in fastening together the die support member flanges 159, plates 141 and 144, leaf spring 149 and extractor member 156. A single shorter screw 164 (FIG. 11) is provided for fastening the outer or front portion of each of the flanges 159 to the die plate 144.

A lower outer or front clamp bar 165 clamps the outer or front end portion of a lower generally horizontal flat leaf spring 166 against the lower surface of the lower flange 161 of die support member 154, this bar being held in clamping condition by a pair of screws 168. The inner or rear end portion of the lower leaf spring 166 is clamped against an abutment surface provided on the frame member 130 by another clamping bar 169 which is held by a pair of screws 170.

The die support member 154 is enclosed by a sheet metal cover member 171 including a front panel 172, an end panel 173 having a cut out in its upper portion indicated at 174 to accommodate a portion of the sprocket wheel 139. The cover 171 also includes an opposite end wall 175 (FIG. 11) to which is attached suitably a tape guide 176 over which the tape T' to be punched is drawn as shown in FIG. 7. Each of the cover end walls 173 and 175 is formed to provide an upstanding pin such as the pin designated 178 for end wall 173 which is received in a suitable recess formed in the bottom of die plate 144. Each of these cover end walls adjacent its lower end is provided with a laterally inturned attaching flange such as the flange designated 179 for end wall 175, this flange overlapping the clamping bar 169 and being suitably removably attached thereto as by a screw 180.

The assembly comprising die support member 154, cover 171, die plate 144, guide plate 141 and extractor frame member 156, is adapted to be reciprocated substantially vertically so as to move relative to those of the various punches 134–136 which are not backed up as hereinafter explained. While the means for so reciprocating the aforesaid assembly may be variously constructed, the same is shown as including a toggle linkage represented generally at 181. This toggle linkage 181 includes an upper link 182 and a lower link 183. This lower link 183 is shown as having a pair of spaced downwardly extending arms 184 which fit in the spaces between three forwardly projecting arms 185 formed as an integral part of frame member 130. The arms 184 and 185 are pivotally connected for relative rotation about a horizontal axis by a pivot pin 186. The lower link 183 is also shown as including a pair of upwardly extending arms 188 which are spaced farther apart than the downwardly extending arms 184. The upper link 182 has a construction similar to that of the lower link 183. Thus the upper link 182 includes a pair of downwardly extending spaced arms 189 and an upwardly extending pair of arms 190. The lower arms 189 fit between the upper arms 188 and are pivotally connected together for relative rotation about a horizontal axis by a pivot pin 191. The upper arms 190 of upper link 182 are pivotally connected for movement about a horizontal axis to the end walls 158 of the die support member 154. This pivotal mounting includes a horizontal pivot pin 192 the ends of which extend beyond the alined openings provided in the upper arms 190 and are severally received in eccentric journal blocks 193.

Each journal block 193 has an eccentric hub indicated at 194 received in a hole of similar diameter provided in the corresponding die support end wall 158. Each block 193 is adapted to be held in a fixed angular position relative to its corresponding die support member end wall 158 by a clamping bar 195 which at one end overlaps the outer end face of the block 193 and at its opposite end has a laterally turned flange 196 which bears against the outside face of the corresponding die support member end wall 158. The end face of each such clamping bar flange 196 has a central lug 198 projecting therefrom which is received in a suitable recess 199 provided in the corresponding die support member end wall 158. A clamping screw 200 passes through a hole provided between the flange 196 and the free end of the bar 195 and is threadedly received in a hole provided in the corresponding end wall 158. Thus by first loosening such screws 200 the eccentric blocks 193 may be rotated about the axis of pivot pin 192 to orient the axis of this pin with respect to the axes of the other pins 186, 191. When the desired position is achieved these eccentric blocks can be fixed relative to the end walls 158 by tightening the clamping screws 200.

Figure 8:
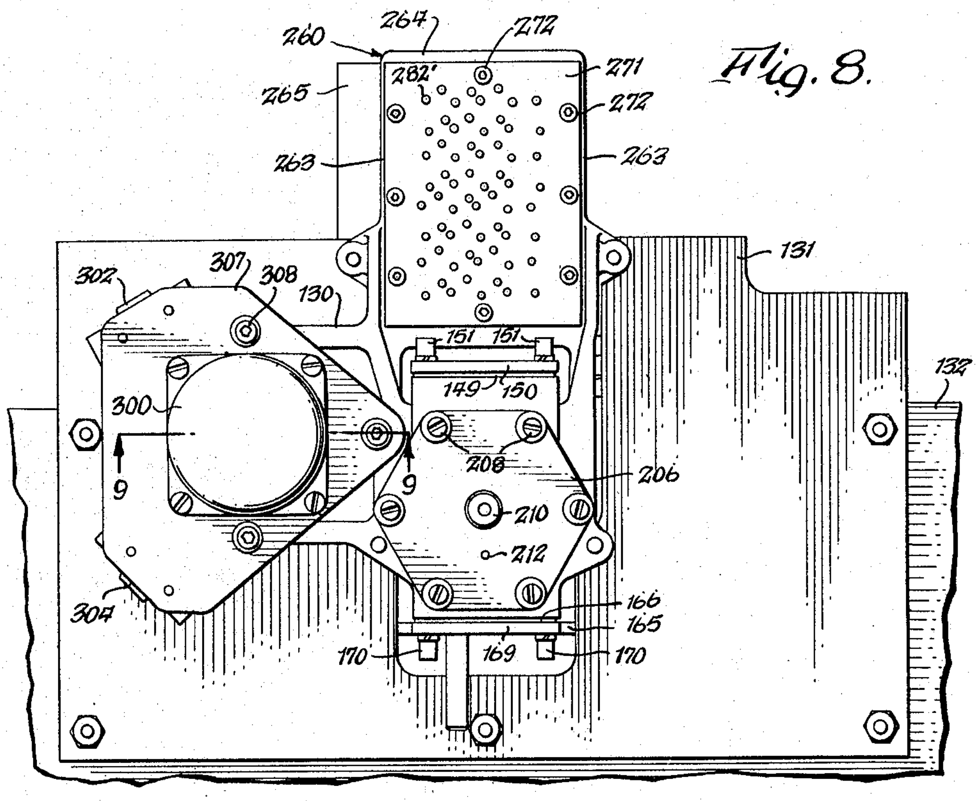
FIG. 8 is an elevational view of the inner or rear side of the tape punch device shown in FIG. 7.

Pneumatic means are shown for moving the center pivot pin 191 transversely of a plane connecting the axes of the upper and lower pivot pins 192 and 186, respectively. For this purpose the space between the lower arms 189 of the upper link 182 is shown as occupied by the forward end of a piston rod 201. The rear end of this piston rod is suitably connected to a piston head represented generally at 202. This head 202 is arranged in a recess or pocket 203 formed in frame member 130 and having a hole 204 in the end wall of such recess through which the rod 201 extends. Sealingly connected to piston 202 is a flexible diaphragm 205, the marginal portion of which is clamped against the rear face of the frame 130 by a cover 206. This cover is attached to the frame by suitable screws 208 (FIG. 8).

The piston head 202 is supported centrally within the recess 203 by being provided with a central recess 209 which receives the inner end of a support stud 210. This stud 210 is screwed into a central hole provided in cover plate 206. Thus a chamber 211 is provided conjointly by the piston head 202, diaphragm 205 and cover plate 206. Air under pressure is admitted to chamber 211 at the appropriate time through a hole 212 through which this chamber may also be exhausted. A helical compression spring 213 is shown as operatively interposed between the inner end wall of recess 203 and piston 202. This spring constantly urges piston head 202 in a leftward direction as viewed in FIG. 12.

Suitable means (not shown) are provided for controlling the admission of pressurized air through hole 212 into actuating chamber 211. It will be seen that when this chamber is filled with pressurized fluid to overcome the urging of spring 213 the rod 201 will be driven in a rightward direction which will tend to aline links 182 and 183. This will cause the effective spacing between the axes of pivot pins 186 and 192 to increase. Since lower pivot pin 186 is fixed upper pivot pin 192 is elevated causing the previously described assembly including members 141 and 144 and 156 associated therewith also to elevate. When the pressure of the drive fluid is relieved, spring 213 will exhaust chamber 211 by driving the piston head 202 in a leftward direction and in so doing will tend to collapse the toggle linkage 181 thereby lowering the aforementioned assembly.

The tape punch device 29 operates on the principle that the tape T′ is elevated by plate 144 and will be punched by the various punches 134–136 if such punches are effectively backed up and hence prevented from being elevated by the tape, but if any punch is not effectively backed up the tape engaging the lower end of such punch will elevate such punch and no hole will be punched in the tape. It will be understood that as the tape T′ is elevated relative to at least some of the punches 134–136 which remain stationary, these stationary punches will project through the tape and form holes or perforations therein. Upon subsequent downward movement of the elevated assembly which includes guide plate 141 it is desirable to extract any punches which have perforated the tape T′.

Figure 18:
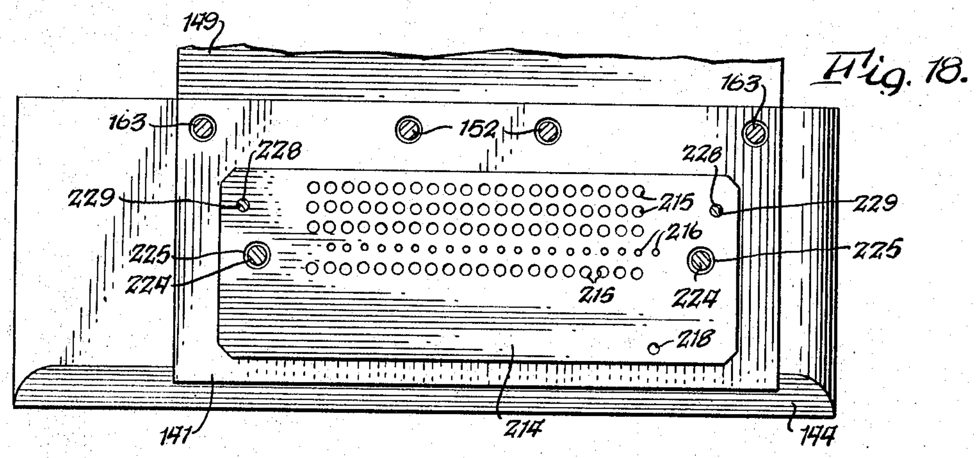
FIG. 18 is an enlarged horizontal sectional view thereof taken on line 18—18 of FIG. 11.
Figure 19:
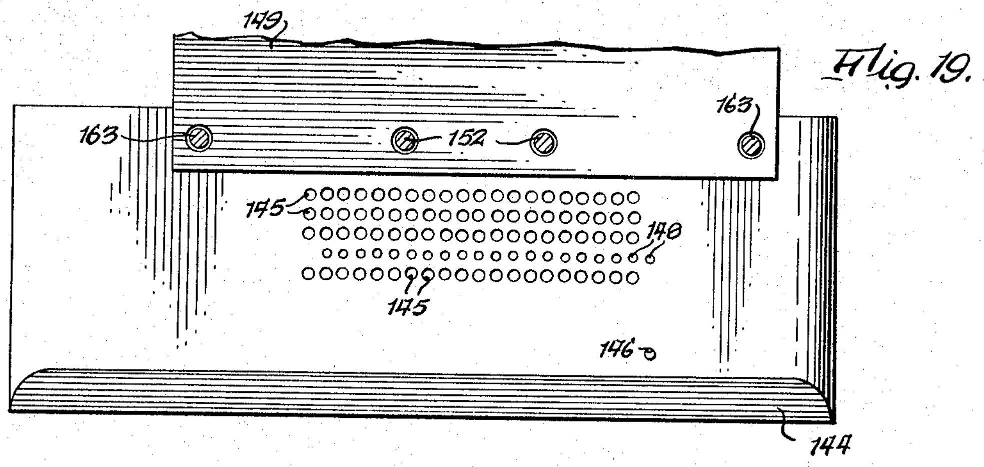
FIG. 19 is an enlarged horizontal sectional view thereof taken on line 19—19 of FIG. 11.

While extractor means for the punches may be variously constructed such means is shown as including an extractor plate 214. Such plate 214 is shown as being a generally rectangular plate (FIG 18) and including a pluarility of holes in like number and diametral size to the lower portions of the various punches 134–136. Thus the extractor plate 214 has a series of holes 215 in vertical alinement severally with the holes 140 in punch guide plate 141. The plate 214 also has a series of holes 216 in vertical alinement and of the same size as holes 143 in punch guide plate 141. The extractor plate 214 also has a hole 218 in vertical alinement with hole 142 in the punch guide plate 141.

Figures 12, 13, 14:
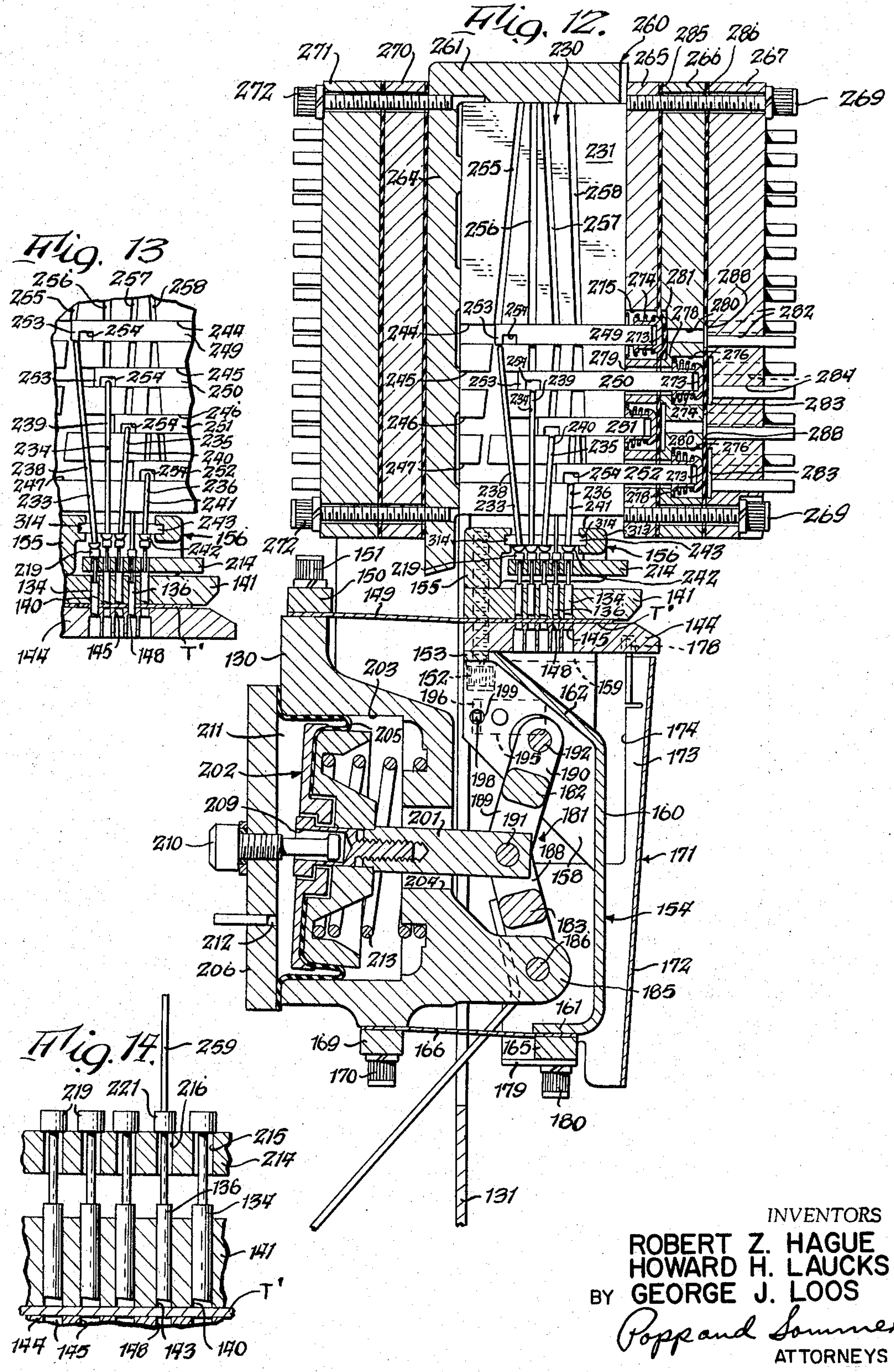
FIG. 12 is a vertical central transverse sectional view thereof and illustrates the condition of the device preparatory to punching a tape, this view being taken on line 12—12 of FIG. 11.
FIG. 13 is a fragmentary sectional view similar to the central portion of the tape punch device as shown in FIG. 12 but illustrating the condition of the device during punching.
FIG. 14 is an enlarged fragmentary sectional view of the row of punches and certain associated mechanism shown in FIG. 12.

Each of the punches 134 is shown as having an enlarged head 219; the indexing punch 135 has an enlarged head 220 on its upper end which is considerably elongated vertically; and each of the sprocket tooth hole punches 136 has an enlarged head 221 on its upper end. Each of the punches 134–136 immediately below its respective enlarged upper head is provided with a shank portion of reduced diameter, as best illustrated in FIG. 14. This provides each of the punch heads 219–221 with a downwardly facing shoulder adapted to engage the upper flat horizontal surface of extractor plate 214.

Extractor plate 214 is held stationary. As best shown in FIG. 11, this is achieved by this plate bearing against the downwardly facing horizontal surfaces of a pair of laterally spaced abutments 223 formed as an integral part of frame member 130. At each end the extractor plate 214 is held by a screw 224 the shank of which extends upwardly through a hole 225 provided in plate 214 and is screwed into a threaded recess 226 provided in corresponding abutment 223. The extractor plate 214 is preferably precisely located by a pair of dowel pins 228 extending downwardly from the abutments 223 and received in mating holes 229 formed in the plate. The punch guide plate 141 is provided with suitable holes opposite the heads of screws 224 so that these holes may receive these heads partly when the plate 141 is elevated.

Individual back up means is provided for each of the binary encoded punches 134 so that these back up means may be selectively rendered ineffective. If the back up means is effective, the corresponding punch cannot be elevated by the tape T′ and the punch will perforate the tape. If, on the other hand, a given punch 134 is not effectively backed up it will be elevated by the tape T′ when the same is raised. Inasmuch as the sprocket tooth hole punches 136 are always to punch holes, these punches are effectively backed up at all times. Likewise the indexing hole punch 135 is effectively backed up at all times.

The selectively operable back up means for the various binary encoded information punches 134 in a given row transversely of the tape is shown as including a support plate 230. This plate stands on one end and is shown as being of vertically elongated rectangular outline and has opposite flat vertical surfaces 231 and 232. The surface 231 is shown as provided with four generally vertical grooves 233, 234, 235 and 236. These grooves 233–236 are downwardly convergently directed toward the corresponding row of punches 134. Referring to FIG. 12, it will be seen that groove 234 is vertical, groove 233 to its left slants upwardly and to the left, groove 235 slants upwardly and to the right, as does also groove 236 but at a steeper angle. Severally slidably arranged in grooves 233–236 are pusher rods 238, 239, 240 and 241, respectively. Rod 238 is the longest, rod 239 is somewhat shorter, rod 240 is still shorter and rod 241 is the shortest. The lower end of each of the rods is shown as provided with an enlarged hemispherical head 242 which is provided with a substantially horizontal annular shoulder arranged below a corresponding transverse extractor bar 243 as more fully explained hereinafter.

Each support plate 230 is provided with a second series of grooves, these being four in number, horizontally disposed and vertically supaced and being designated 244, 245, 246 and 247 respectively from the uppermost to the lowermost. These grooves 244–247 traverse the first described grooves 233–236. Slidably arranged for horizontal movement in the upper groove 244 is a bar 249. Similar bars 250, 251 and 252 are provided respectively in horizontal grooves 245–247 and these bars are of different lengths. Each of the bars 249–252 has an inner end portion indicated at 253 which is normally positioned opposite the upper end of the corresponding pusher rod as illustrated for slide bar 249 in association with its pusher rod 238. Adjacent such portion 253, each of the slide bars 249–252 is provided with a recess 254 adapted to be positioned opposite the upper end of the corresponding pusher rod so that when such recess is opposite the upper end of the bar, as illustrated in FIG. 12 for the slide bars 250–252, the corresponding pusher rod may be raised so that its upper end will enter such recess 254 as depicted in FIG. 13. It will be noted that left pusher rod 238 is effectively backed up by portion 253 of uppermost slide bar 249.

Each of slide bars 249–252 is biased horizontally outwardly so that its inner end portion 253 is opposite the upper end of the corresponding pusher rod 233–236 thereby effectively backing up the corresponding punch 134, but each such bar is adapted to be moved inwardly to push the bar recess 254 opposite the upper end of the corresponding pusher rod, in a manner hereinafter explained in greater detail.

In order to prevent interference with the means for moving the various slide bars 249–252 for each row of punches 134, the outer ends of these slide bars for a given support plate 230 are alternately staggered. The outer ends of the similar slide bars for one support plate 230*a* adjacent a given support plate 230 are arranged on the same lateral side as those for support plate 230 but in the upper half portion of such adjacent support plate. As well, the next two adjacent support plates 230*b* and 230*c* have their slide bars extending from the opposite lateral side and arranged alternately in the lower and upper half portions. Thus the slide bars of a first support plate 230 extend from say the right side of such plate as viewed in FIG. 12, this side being the front of the tape punch device; a second support plate 230*a* adjacent to that one shown in FIG. 12 has its slide bars extending also from the right side or front but in its upper half portion; the next or third support plate 230*b* has its slide bars extending to the left or rear and are arranged in its lower half portion; and the fourth support plate 230*c* has its slide bars arranged in its upper half portion of the plate and also extending to the left or rear. A study of FIGS. 11, 12, 15 and 16 will make this clear.

The flat and ungrooved side 232 of one support plate 230 closes the grooves 233–236 and 244–247 provided in the adjacent support plate as best shown in FIG. 11 which also reveals how the various plates 230 are stacked horizontally against one another. These plates are all similar one to another except that they are alternately inverted as shown in FIG. 11. Each such plate such as the one 230 illustrated in FIG. 12 has one set of grooves 233–236 convergently directed downwardly and a second set of similar grooves 255, 256, 257, 258 which extend convergently upwardly. When a plate 230 similar to that illustrated in FIG. 12 is used adjacent to the illustrated plate, say plate 230*a*, it is used in an inverted position so that the convergent ends of grooves 255–258 are adjacent the punches 134–136 and the horizontal grooves 244–247 are in the upper half portion of the plate. The pusher rods for a support plate such as plate 230*a* which has its horizontal slide bars arranged in its upper half portion must be longer to reach to the upper half of such support plate than the pusher rods 238–241 shown in FIG. 12. In other words, every other set of pusher rods will be as illustrated in FIG. 12 but intermediate sets of pusher rods will be longer in order to reach the upper half portion of such intermediate support plates. Such longer pusher rods have not been illustrated in the drawings although the construction is readily apparent.

Each of the sprocket drive hole punches 136 is shown as having an upstanding stem 259 (FIGS. 12 and 14) the upper end of which engages the lower end face of the support plate 230 immediately thereover. In this manner the punches 136 are always effectively backed up and are never permitted to be elevated. In a similar manner the enlarged head 220 of the indexing hole punch 135 is elongated vertically sufficiently so that its upper end engages the lower end face of the support plate 230 arranged immediately thereover, actually the right endmost plate as illustrated in FIG. 11. The indexing hole punch 135 can therefore never be elevated and will always punch a hole in the tape.

The back up means for the various binary encoded punches 134 can be selectively rendered inoperative to produce the arrangement of holes in the tape T' to represent the information desired. As previously indicated, the various slide bars 249–252 representing such back up means are normally in an effective position as illustrated for the uppermost slide bar 249 in FIG. 12. However, these bars can be rendered ineffective by moving them inwardly so as to place the recesses 254 in registry with the corresponding pusher rod as depicted for the slide bars 250–252 in FIG. 12. The means for urging such back up means to an effective condition and for selectively rendering such means ineffective will now be described.

The stack of support plates 230 is arranged in a housing indicated generally at 260. This housing is formed preferably as an integral part of frame member 130. As shown, such housing 260 includes a horizontal top wall 261, a pair of vertical end walls 263 and a vertical rear wall 264, all integral with one another. The previously mentioned abutments 223 are downward extensions of the end walls 263. An inner cover plate 265 is arranged against the right hand or front vertical edges of support plates 230 as viewed in FIG. 12. Outwardly of this inner cover plate 265 is an intermediate cover plate 266 and outwardly of this plate 266 is an outer cover plate 267. The assembly of cover plates 265–267 is secured to the housing 260 by a plurality of screws 268 which severally extend through registered holes provided in the plates 265–267 adjacent their vertical side edges, the inner ends of such screws being screwed into threaded recesses provided in the end faces of the end walls 263 as illustrated in FIG. 11. Upper and lower screws 269 also secure cover plates 265–267 together as shown in FIG. 12.

On the opposite side of the stack of support plates 230, the housing rear wall 264 serves as an inner cover plate against which there is arranged an intermediate cover plate 270 and against it an outer cover plate 271. The plates 270 and 271 are secured to housing 260 by means of screws 272 which pass through registered holes provided in plates 270 and 271 and have their inner ends screwed into threaded holes provided in side wall 264 as shown in FIG. 12.

Each of slide bars 249–252 is shown as provided with a head 273 attached to the outer end thereof in any suitable manner as by being pinned thereto. Bearing against this head 273 is the outer end of a coil spring 274. In the case of slide bars 249 and 251, shown in FIG. 12, the inner ends of the coil springs 274 bear against the lateral end faces of the stack of support plates 230 and suitable holes 275 are arranged in inner cover plate 265 to house severally such springs and their corresponding heads 273. The outer ends of slide bars 250 and 252 extend outwardly a greater distance, as shown in FIG. 12. Their springs 274 and heads 273 are arranged within a counterbored recess 276 provided in intermediate cover plate 266. The inner end of each spring 274 for slide bars 250 and 252 bears against the outwardly facing annular shoulder 278 provided by the corresponding counterbored hole 276. In registry with the holes 276 are holes 279 provided in inner cover plate 265. Holes 279 permit the intermediate portions of slide bars 250 and 252 to extend through inner cover plate 265. Extending axially from each hole 275 in inner cover plate 265 is a hole 280 provided in intermediate cover plate 266. The inner end of each such hole 280 is counterbored shallowly as indicated at 281.

Since FIG. 12 is taken substantially centrally through the stack of support plates 230, the support plate illustrated in FIG. 12 is one which services one of the dimensions for the X or Y-axis. Therefore two conduits are shown associated with each slide bar 249–252 illustrated in FIG. 12 since one conduit is representative of the conduit 86 shown in FIG. 2 and the other representative of the conduit 99 also shown in FIG. 2. Accordingly, each of holes 280 shown in FIG. 12 is associated with a pair of holes 282 in outer cover plate 267 and has a nipple extending outwardly therefrom for the attachment of tubing or conduit (not shown).

Opposite each slide bar 250 and 252, outer cover plate 267 is shown as provided with a relatively shallow recess 283 which opposes the corresponding hole 276 in intermediate cover plate 266. Outer plate 267 is also provided with a pair of holes 284 and associated nipples which at their inner ends communicate with recess 283.

An inner diaphragm sheet 285 is clamped between plates 265 and 266 and has suitable holes therein to permit the passage of the attaching screws 268, 269 and also holes to permit the passage of the longer slide bars such as bars 250 and 252. Clamped between intermediate cover plate 266 and outer cover plate 267 is another diaphragm sheet 286. Sheet 286 has a hole 288 therein opposite each of holes 280 in intermediate cover plate 266. Each such hole 288 is in fluid conducting communication not only with the corresponding hole 280 in intermediate cover plate 266 but also with the corresponding pair of holes 282 in outer cover plate 267. The portions of the sheets 285 and 286 which extend across holes 275 and 276 provide diaphragms for the corresponding slide bar such as one of the group 249–252. For example, when air under pressure is present in one of holes 284, it is also present in the other one of such pair and is also present in recess 283 across which a portion of sheet 286 extends to provide a diaphragm for slide bar 250.

Figures 15, 16:
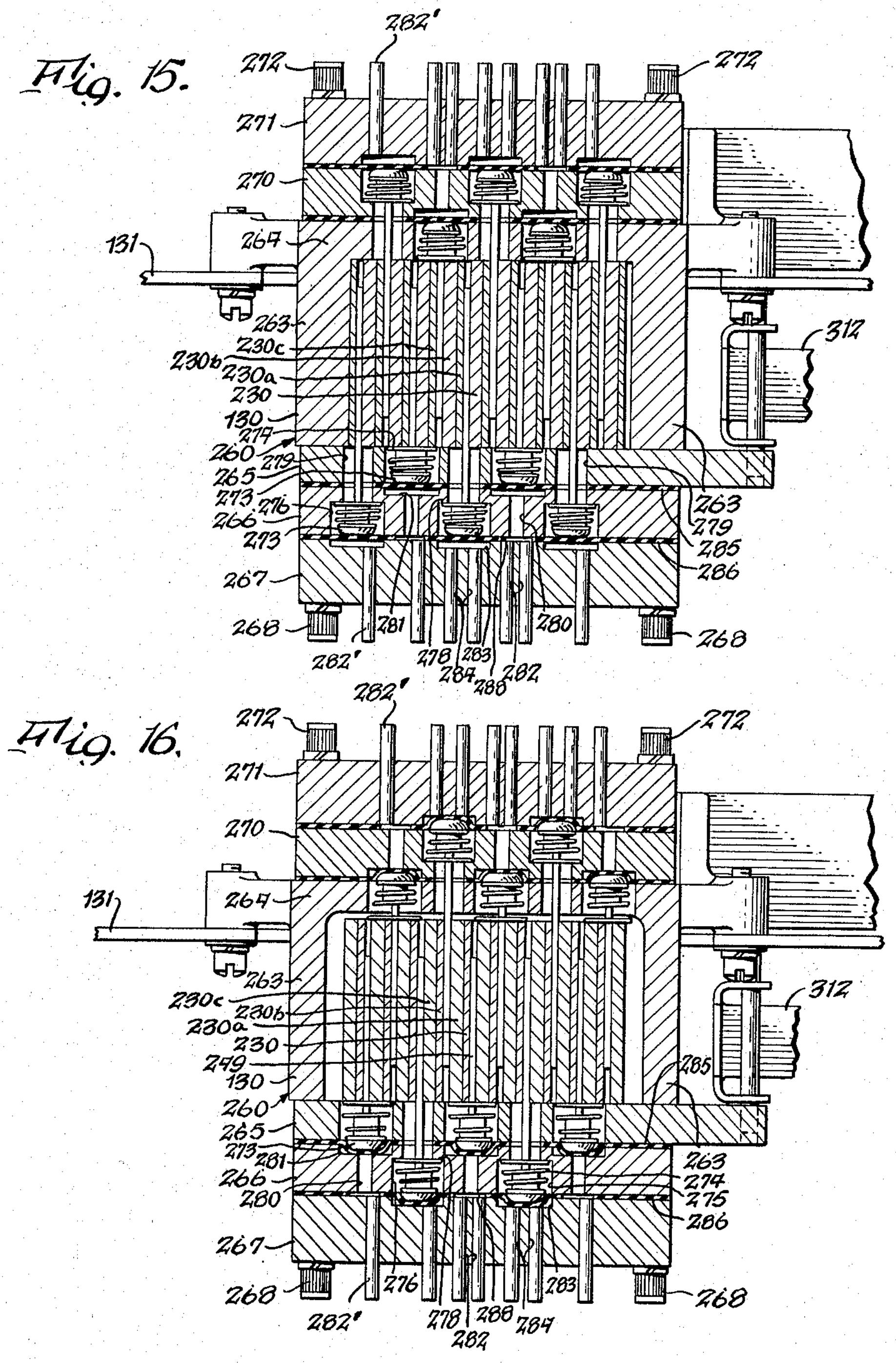
FIG. 15 is a horizontal sectional view of the tape punch device taken on line 15—15 of FIG. 11.
FIG. 16 is a horizontal sectional view thereof taken on line 16—16 of FIG. 11.

As illustrated in FIG. 12, recesses 281 and 283 for slide bars 250–252 are shown pressurized so that these slide bars have been displaced to the left as viewed in FIG. 12, whereas the uppermost slide bar 249 is shown in its normal position as maintained by its spring 274. In other words, pressurized air is absent in upper hole 280 and the associated pair of holes 282. In FIG. 15 all of the slide bars are shown actuated, but none are shown actuated in FIG. 16.

It will be understood that since there are five digits to each of the X and Y dimensions, there must be ten sets of bars such as the bars 249–252, each such bar having a pair of service holes such as 282 and 284. The second service hole is required, as previously explained, because the pressure sensed must also be transferred to the pneumatic-hydraulic transducer on machine tool 21. However, in the case of other information such as sequence number, preparatory function, tool member and miscellaneous function, i.e. rows 1–4 and rows 7–19 of the tape T shown in FIG. 2, only one service hole similar to 282 or 284 need be provided. This is the reason why the outer vertical rows of holes shown in FIGS. 15 and 16 are provided with only one service nipple typically indicated at 282' whereas the intermediate vertical rows are provided with two service nipples. Also shown two vertical rows of paired service nipples are shown for front outer cover plate 267 whereas on rear outer cover plate 271 there are three vertical rows of paired service nipples shown.

Figure 9:
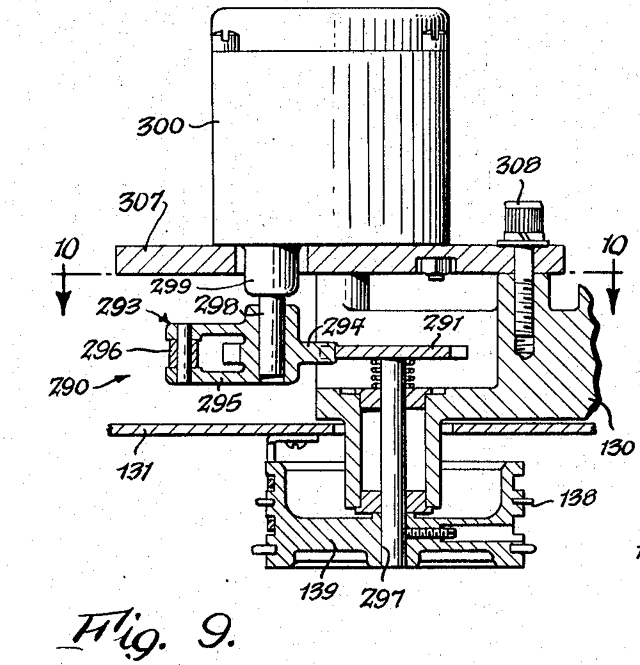
FIG. 9 is an enlarged fragmentary horizontal sectional view thereof taken on line 9—9 of FIG. 8.
Figure 10:
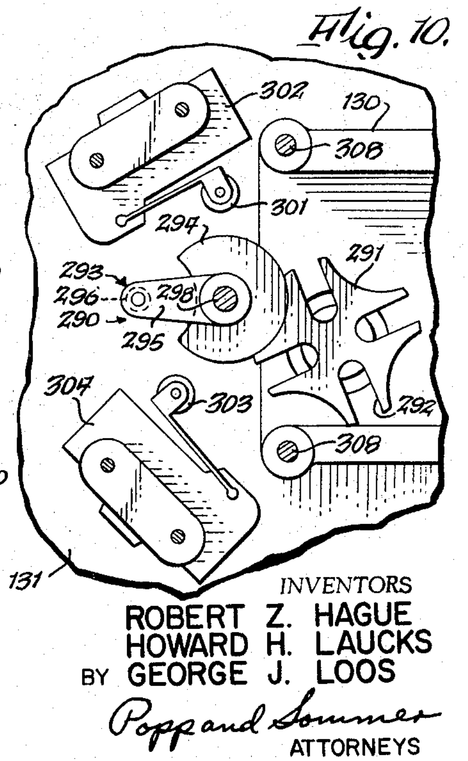
FIG. 10 is a fragmentary vertical sectional view thereof taken on line 10—10 of FIG. 9.

Suitable drive means are provided for imparting a predetermined but adjustable angular movement to sprocket wheel 139. Such means are shown in FIGS. 8–10 as comprising a Geneva mechanism indicated generally at 290. This mechanism includes a Geneva cross member 291 having a series of radial slots 292 each adapted to cooperate successively with a Geneva cam member 293. The member 291 is suitably fastened to the rear end of a horizontal drive shaft 297 suitably journalled on frame member 130 and has mounted on the forward end thereof the sprocket wheel 139 which is arranged on the front or outer side of panel 131. This cam member 293 has a partial cylindrical hub 294 and an arm 295 the outer end of which carries a roller 296. The cam member 293 is fast to the output or driven shaft 298 of a gear reducer 299 driven by an electric motor 300. The motor and gear reducer assembly 300, 299 is suitably mounted on a support plate 307 which in turn is fastened to the frame member 130 as by screws 308.

As shown in FIG. 10, the Geneva cam member 293 is adapted to engage a trip 301 of an electrical switch 302 and also a trip 303 of a second electrical switch 304. The switches 302 and 304 are suitably fastened to support plate 307. Switch 304 is operatively associated with electric motor 300 and switch 302 is operatively associated with an air solenoid valve (not shown).

Sprocket wheel 139 is arranged adjacent die member 144. The tape T' is held against its upper surface as the tape approaches this die member 144 by a weight 309 which isshown in FIGS. 11 and 17 as being in the form of a cylindrical rod suitably fastened to the outer end of a pivot arm 310 the inner end of which is suitably mounted in ears 311 forming lateral extensions of extractor member 156. As tape T' passes over and around sprocket wheel 139, it is held thereagainst by a spring loaded pivotally mounted retainer 312.

Figure 17:
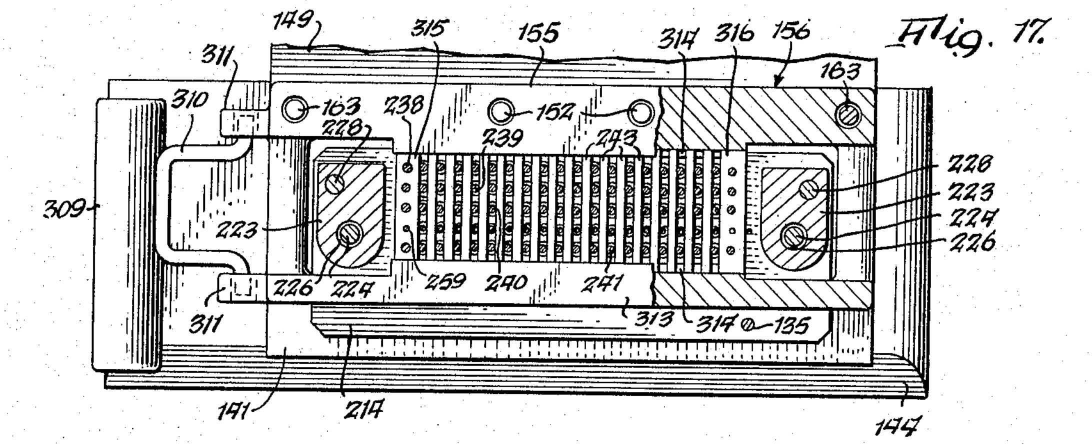
FIG. 17 is an enlarged horizontal section view thereof with portions broken away to reveal hidden structure and taken on line 17—17 of FIG. 11.

Adverting to the generally rectangularly shaped pusher rod extractor frame member 156, it includes in addition to the rear bar 155 a front bar 313 spaced from the rear bar and parallel thereto. The inner and opposing faces of these bars 155, 313 are each provided with a horizontal groove 314 which slidingly receives the corresponding end of each transverse extractor bar 243. As shown in FIG. 17, such a bar 243 is provided between each pair of adjacent transverse rows of pusher rods 238–241 except the endmost rows which instead have their shanks slidably projecting through holes in transverse extractor end bars designated 315 at one end and 316 at the other end. The stem 259 of one endmost drive hole punch 136 is shown as projecting upwardly through a hole in the end bar 315. All of the extractor bars 243, 315 and 316 have their lower surfaces adapted to be engaged by the upwardly facing shoulders on each row of headed pusher rods 238–241.

When the tape T' is elevated for punching as depicted in FIG. 13, the extractor bars 243, 315 and 316 are also elevated to allow those pusher rods, such as rods 239–241, which are not effectively backed up to be elevated by their respective punches 134 in turn elevated by the tape. The upper ends of these pusher rods 239–241 move into their respective recesses 254 in slide bars 250–252. However, when the extractor frame member 156 is subsequently lowered the extractor bars 243, 315 and 316 bear down against the heads of those pusher rods which had been elevated and withdraw these pusher rods from the recesses 254 thereby returning these rods to the starting position shown in FIG. 12.

ADD-FUNCTION DEVICE (FIG. 20)

Figure 20:
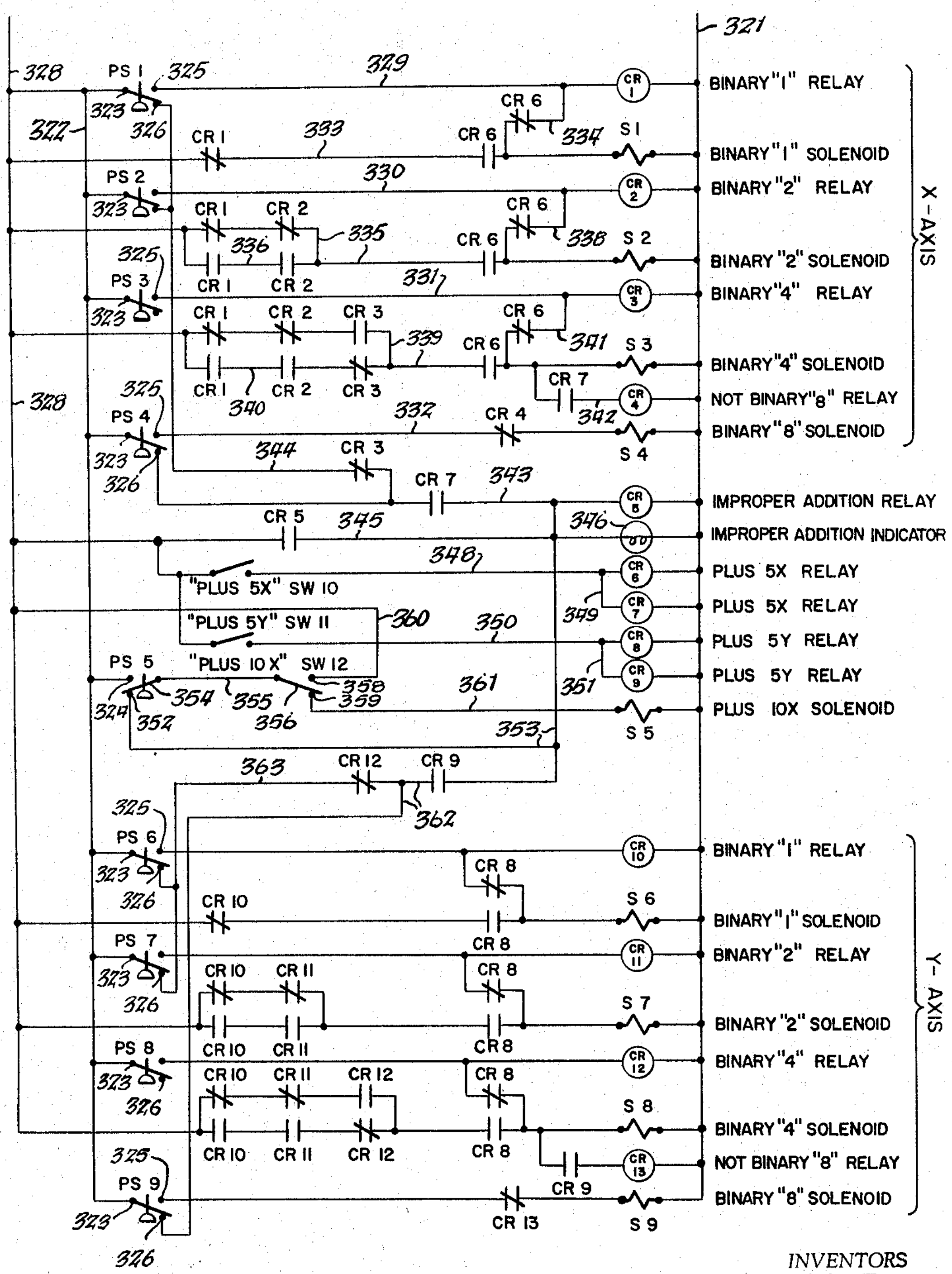
FIG. 20 is an electrical circuit diagram of the add-function device shown in FIGS. 1 and 2.

The circuit diagram of the add-function device (30 in FIG. 1 and 103 in FIG. 2) is illustrated in FIG. 20. The purpose of this device is to add either 5, 10 or 15 to the X dimension or 5 to the Y dimension, as desired.

Referring to FIG. 20, the electrical circuit is shown as including nine pressure switches designated respectively PS1–PS9, thirteen control relays designated respectively CR1–CR13, a plus 5X switch designated SW10, a plus 5Y switch designated SW11, a plus 10X switch designated SW12, and nine solenoid coils designated respectively S1–S9. Each of control relays CR1–CR13 and each of solenoids S1–S9 is shown as having one side thereof connected to a first main power line 321. Each of pressure switches PS1–PS9 is shown as having a contact connected to a branch power line 322, such contact being designated 323 for all of the pressure switches with the exception of pressure switch PS5 whose corresponding contact is designated 324. Each of pressure switches PS1–PS4 and PS6–PS9 has a normally open contact designated 325 and a normally closed contact designated 326. Branch power line 322 is connected to a second main power line 328.

Contacts 323, 325 of pressure switch PS1 and control relay CR1, the latter designated binary 1 relay, are arranged in series in a line 329 connected at opposite ends to power lines 321, 322. Contacts 323, 325 of pressure switch PS2 and control relay CR2, the latter designated binary 2 relay, are arranged in series in a line 330 extending between power lines 321, 322. Contacts 323, 325 of pressure switch PS3 and control relay CR3, the latter designated binary 4 relay, are arranged in series in a line 331 connected to power lines 321, 322. Contacts 323, 325 of pressure switch PS4, solenoid S4 designated binary 8 solenoid, and a pair of normally closed contacts of relay CR4 are arranged in series in a line 332 which extends between power lines 321, 322.

A pair of normally closed contacts of relay CR1, a pair of normally open contacts of relay CR6 and a solenoid S1, the latter designated binary 1 solenoid, are arranged in series in a line 333 extending between lines 321, 328. A shunt line 334 having therein a pair of normally closed contacts of relay CR6 is connected at one end to line 329 between switch PS1 and relay CR1 and at its other end to line 333 between solenoid S1 and the contacts of relay CR6.

A pair of normally closed contacts of each of relays CR1 and CR2, a pair of normally open contacts of relay CR6 and solenoid S2, the latter designated binary 2 solenoid, are arranged in series in a line 335 extending between lines 321, 328. A branch line 336 having therein a pair of normally open contacts of each of relays CR1 and CR2 is connected to line 335 so as to bypass the normally closed contacts of relay CR1 and CR2 in such line 335. A shunt line 338 having therein a pair of normally closed contacts of relay CR6 is connected at one end to line 330 between switch PS2 and relay CR2 and at its other end to line 335 between solenoid S2 and the contacts of relay CR6.

A pair of normally closed contacts of each of relays CR1 and CR2, a pair of normally open contacts of each of relays CR3 and CR6 and solenoid S3, the latter designated binary 4 solenoid, are arranged in series in a line 339 which extends between lines 321, 328. A branch line 340 having therein a pair of normally open contacts of each of relays CR1 and CR2 and a pair of normally closed contacts CR3 is connected at opposite ends to line 339 so as to bypass the contacts of relays CR1, CR2 and CR3 in such line 339. A shunt line 341 having therein a pair of normally closed contacts of relay CR6 is connected at one end to line 331 between switch PS3 and relay CR3 and at its other end to line 339 between solenoid S3 and the contacts of relay CR6. A branch line 342 is connected at one end to line 339 between solenoid S3 and the contacts for relay CR6 and includes in series control relay CR4, designated not binary 8 relay, and a pair of normally open contacts of relay CR7, the latter designated plus 5X relay.

Contact 326 of pressure switch PS4 is connected to power line 321 by a line 343 which includes in series control relay CR5, designated improper addition relay, and a pair of normally open contacts of relay CR7.

Contacts 326 of pressure switches PS1 and PS2 are connected to line 343 between contact 326 of pressure switch PS4 and the contacts of relay CR7 by a branch line 344 which has a pair of normally closed contacts of control relay CR3 therein.

A line 345 extends between lines 321, 328 and includes in series a pair of normally open contacts of relay CR5 and a lamp 346. This lamp 346 is designated improper addition indicator.

Switch SW10 and control relay CR6, the latter designated plus 5X relay, are arranged in series in a line 348 connected at one end to power line 321 and at its other end to line 345 between main power line 328 and the contacts of relay CR5. A branch line 349 having therein control relay CR7 is connected at one end to power line 321 and at its other end to line 348 between switch SW10 and relay CR6.

Switch SW11 and control relay CR8, the latter designated plus 5Y relay, are connected in series in a line 350 one end of which is connected to power line 321 and the other end to line 348 between switch SW10 and line 345. A branch line 351 having therein control relay CR9, designated plus 5Y relay, is connected at one end to power line 321 and at its opposite end to line 350 between switch SW11 and relay CR8.

Pressure switch SW5 is shown as having another contact 352 which is connected by line 353 to both lines 343 and 345. The connection of line 353 to line 343 is between relay CR5 and the contacts of relay CR7. The connection of line 353 to line 345 is between lamp 346 and the contacts of relay CR5. The movable connector 354 of pressure switch PS5 is connected at all times by a line 355 to the movable connector 356 of switch SW12. This switch SW12 has two contacts 358 and 359. Contact 358 is connected to main power line 328 by a line 360. Contact 359 is connected to the other main power line 321 by a line 361 having therein solenoid S5, the latter designated plus 10X solenoid.

Pressure switches PS1–PS5, switches S10 and S12, relays CR1–CR4, CR6 and CR7, and solenoids S1–S4, are operatively associated with the X-axis. Pressure switches PS6–PS9, switch S11, relays CR8–CR13 and solenoids S6–S9 are operatively associated with the Y-axis. The interrelationship of the various pressure switches PS6–PS9, relays CR10–CR13 and solenoids S6–S9 for the Y-axis is the same as that for the corresponding pressure switches PS1–PS4, relays CR1–CR4 and solenoids S1–S4 for the X-axis and hence a repetitive description for the Y-axis will not be made.

Relay CR5 and lamp 346 are operatively associated with both the X and Y axes. Their relationship to the X axis has been explained. Their relationship to the Y axis will now be explained.

Contact 326 of pressure switch PS9 is shown as connected to line 353 by a line 362 having therein a pair of normally open contacts of relay CR9. Contacts 326 of pressure switches PS6 and PS7 are connected to line 362 by a line 363 having therein a pair of normally closed contacts of relay CR12. The connection of line 363 to line 362 is between pressure switch PS9 and the contacts of relay CR9.

Figure 6:
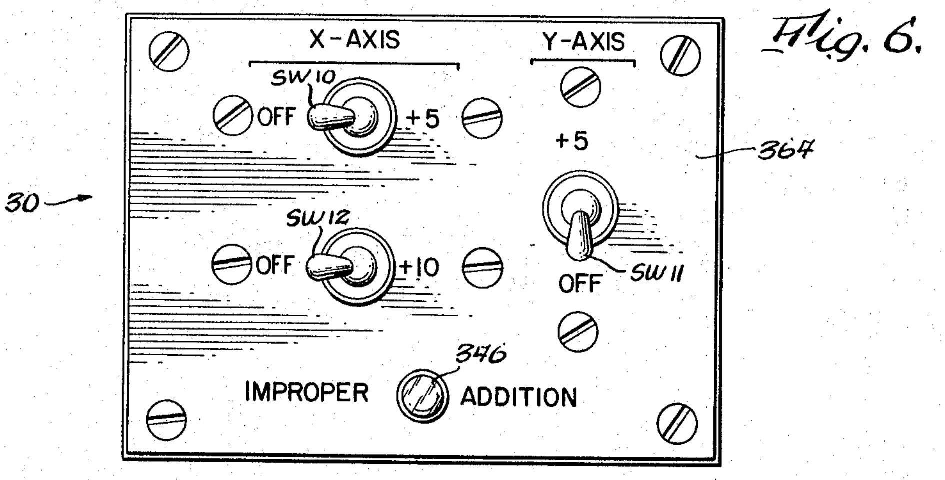
FIG. 6 is an elevational view of the control panel of the add-function device shown in FIG. 1.

The plus 5X switch SW10, the plus 5Y switch SW11 and the plus 10X switch SW12 are shown in FIG. 6 as arranged on a panel 364 of the add-function device 30, also shown in FIG. 1. These switches are accessible by opening a door 365 in the front of control console 26. Panel 364 also supports the improper addition indicator lamp 346 which may be viewed through the window in front console door 365.

In explaining the operation of the add-function device, designated 30 in FIGS. 1 and 6 and 103 in FIG. 2, it will first be assumed that the switches SW10 through SW12 are in their "off" position as depicted in the circuit diagram of FIG. 20. As previously explained, if a new tape is being made on the tape punch device 29 as a duplicate of an existing punched tape being read on the tape reader 28, the end result desired is to punch a hole in the new tape wherever a hole exists in the corresponding location in the existing tape.

Pressure switches PS6–PS9 shown in FIG. 20 associated with the Y-axis correspond to pressure switch 102 shown in FIG. 2. These pressure switches are associated with tape row 11 as also shown in FIG. 2. On the other hand, while pressure switches PS1–PS4 shown in FIG. 20 are analogous to pressure switch 102 shown in FIG. 2, the switches PS1–PS4 are operatively associated with tape row 6 for the X-axis. Pressure switch PS5 shown in FIG. 20 is operatively associated with track 1 of row 5 in the tape since its function is merely to sense a hole in track 1 of tape row 5.

The operation of the add-function device circuit shown in FIG. 20 will be described in connection with the X-axis inasmuch as that portion of the circuit associated with the X-axis was described in detail.

Assuming that there is no hole in tape row 6, it will be seen that pressure switches PS1–PS4 will sense a pressure in the corresponding four tape reader signal conduits such as typically represented by the conduit 123 in FIG. 2. All of these pressure switches PS1–PS4 will therefore be actuated so that their movable connectors will connect the respective contacts 323 and 325 thereof. A circuit will thereupon be closed through the various solenoids S1–S4. For example, solenoid S1 will be energized by a circuit beginning at power line 328, passing closed contacts 323, 325 of pressure switch PS1, line 329, line 324 and that portion of line 333 including solenoid S1 and leading to the other main power line 321. A similar closed circuit will be established through the other solenoids S2–S4.

If the plus 5X switch SW10 is now closed, relays CR6 and CR7 are energized. Such energization of relay CR6 reverses the relationship of its contacts in lines 334, 338 and 341. Keeping in mind that adding five to zero must cause the punching of holes in tape tracks having values 1 and 4, the associated solenoids S1 and S3 must not be energized and solenoids S2 and S4 must be energized. Solenoid S1 is not energized because relay CR1 is, and, therefore, its contacts in line 333 are opened. Since pressure switches PS1–PS3 will have been closed and, therefore, relays CR1 through CR3 will have been energized, the various contacts of these relays CR1–CR3 in lines 339 and 340 will prevent solenoid S3 from being energized. If solenoid S3 is not energized, neither is relay CR4. Solenoid S2 will be energized because contacts of relays CR1 and CR2 in line 336 will be closed. Since relay CR4 will not be energized, its contacts in line 332 will remain closed and since pressure switch PS4 is closed, solenoid S4 will be energized.

Assume now that a hole exists in the first tape track having the value 1, pressure switches PS2–PS4 are actuated but pressure switch PS1 is not. If it is desired to add five by closing plus 5X switch SW10, this energizes relays CR6 and CR7. Then relays CR2 and CR3 are energized. Relay CR1 is not energized and, therefore, relay CR84 cannot be energized. The objective is 6 with a hole in each of the tape tracks having the values of 2 and 4. Therefore solenoids S2 and S3 should not be energized. Conversely, since holes are not wanted in the tape for the track values 1 and 8, solenoids S1 and S4 should be energized. Solenoid S1 is energized by the closing of the contacts of relay CR6 in line 333, the contacts for relay CR1 in such line remaining closed. Solenoid S2 is not energized because relay CR2 is actuated. Solenoid S3 is not energized because the contacts of relay CR2 in lines 339 and 340 are transferred whereas those contacts of relay CR1 in such lines are not. Solenoid S4 is energized because the contacts of relay CR4 in line 332 remain closed.

Assume now that the original number in the tape is 2 which means that a hole is in the second track having the value 2. Pressure switches PS1, PS3 and PS4 are actuated but pressure switch PS2 is not. If it is now desired to add five to the original value of 2 so that the total is seven, then there must be produced in the new tape holes in the first three tracks having the respective values 1, 2 and 3 but no hole in the fourth track having the value 8. This means that the solenoids S1, S2 and S3 must be deenergized but that solenoid S4 must be energized. By throwing plus 5X switch SW10, relay CR6 and CR7 are energized. Then relays CR1 and CR3 are energized but relays CR2 and CR4 are not. Solenoid S1 is not energized because relay CR1 is energized. Solenoid S2 is not energized because relays CR1 is and CR2 is not. Solenoid S3 is not energized because relays CR1 is but CR2 is not. Solenoid S4 is energized because relay CR4 is not and pressure switch PS4 is actuated.

Assume now that the original value on the tape is 3. This means there are holes in the first two tracks having respective values 1 and 2. Therefore, pressure switches PS1 and PS2 are not actuated but pressure switches PS3 and PS4 are. To add five to this original number will make a total of eight, requiring a hole to be punched only in the fourth tape track having the value 8. This will require solenoids S1, S2 and S3 to be energized but solenoid S4 to remain de-energized. When the plus 5X switch SW10 is thrown, relays CR6 and CR7 are energized. Relays CR1 and CR2 are not energized but relay CR3 is energized. Relay CR4 is energized. Solenoid S4 is not energized because relay CR4 is. Solenoids S1, S2 and S3 are energized because relay CR1 and CR2 are not energized but relay CR3 is.

Assume now that the number 4 is originally on the tape. This will be represented by a hole in the third tape track having the value 4. Pressure switches PS1, PS2 and PS4 will be actuated but pressure switch PS3 is not. If the plus 5X switch SW10 is now closed, relays CR6 and CR7 are energized. Relays CR1 and CR2 are energized but relay CR3 is not. As a consequence, relay CR4 is energized. The objective is to represent the number nine which involves holes in tracks having the respective values of 1 and 8. Therefore solenoids S1 and S4 are not to be energized but solenoids S2 and S3 are to be energized. Solenoid S1 is not energized because relay CR1 is energized. Solenoid S2 is energized because relay CR1 and CR2 are both energized. Relay S3 is energized for the same reason that relay CR4 is energized. Solenoid S4 is not energized because relay CR4 is energized.

Assume now that the original number in the tape is 5 which involves holes in tape tracks having the values 1 and 4. This means that pressure switches PS1 and PS3 are not actuated whereas pressure switches PS2 and PS4 are. If it is now attempted to add 5 to the X dimension by closing the plus 5X switch SW10, the following occurs. Relays CR6 and CR7 are energized. This closes the contacts of relay CR7 in line 343. Pressure switch PS1 being unactuated closes a circuit through lines 344, 343, the still closed contacts of relay CR4 the now closed contacts of relay CR7 and also through relay CR5. When relay CR5 is energized so is the improper addition indicator lamp 346. Although the circuit for doing so is not disclosed, the control console 26 is placed in its emergency mode which means that the spindle 24 is instructed to rise if output of the console is connected to the machine tool. Also, an emergency push button 366 is illuminated. Further, all reading functions cease.

A similar energization of the improper addition relay CR5 and indicator lamp 346 occurs whenever an attempt is made, by closing plus 5X switch SW10, to add five to an original number of the X dimension so that the total asked for exceeds nine.

Improper addition relay CR5 is not energized when the original tape number is either 0, 1, 2, 3 or 4. When 0, all pressure switches PS1–PS4 are actuated so that a circuit cannot be closed through either of lines 343 and 344. When the number is 1, pressure switches PS2–PS4 are actuated so that pressure switch PS3 energizes relay CR3 whose contacts in line 344 open and pressure switch PS4 prevents contact of line 343 with power line 322. When the number is 2, pressure switches PS1, PS3 and PS4 are actuated so that relay CR3 is again energized and power line 322 is inaccessible to line 344. When the number is 3, pressure switches PS3 and PS4 are actuated so that the same result as just described occurs. When the number is 4, pressure switches PS1, PS2 and PS4 are actuated so that a circuit cannot be closed through either of lines 343 and 344.

Considering now adding 10 to the dimension, this involves making a hole in the first track having the value 1 in tape row 5. As previously described, pressure switch PS5 is operatively associated with a signal conduit leading to this location on the tape so as to sense the presence or absence of a pressure in such conduit. If a hole exists in the original tape in such location, the result should be an energization of the improper addition relay CR5 and consequent illumination of indicator lamp 346, also with the attending emergency functions as previously described. If, on the other hand, there is no hole in the original tape and it is desired to add 10 to the X dimension, closing plus 10X switch SW12 should result in no energization of solenoid S5.

Let it first be assumed that there is no hole in track 1 in tape row 5. This means that pressure switch PS5 will be actuated so as to close contacts 324, 354. Inasmuch as plus 10X switch SW12 has not as yet been thrown and, therefore, remains in the position shown in FIG. 20, a closed circuit through solenoid S5 will be established by connected lines 355, 361. Energization of solenoid S5 will render ineffective the back up means for the pusher rod associated with the respective punch 134 and no hole will be punched in the tape.

Assume now that it is desired to add 10 to the X dimension by throwing the plus 10X switch SW12. This causes the switch connector 356 to engage contact 358. Accordingly, solenoid 5 is no longer in a closed circuit and this solenoid will not be energized. Therefore the back up means for the corresponding punch will remain effective and a hole will be punched in the tape in the first row of tape track 5.

Assume now that there was a hole in track 1 of tape row 5 before the plus 10X switch SW12 was closed. This condition is represented in the circuit diagram of FIG. 20 wherein pressure switch PS5 is as shown and there is no closed circuit through solenoid S5 so as to energize the same. More specifically, the connector 354 of pressure switch PS5 will engage contact 352. If now the plus 10X switch SW12 is thrown so as to move its connector 356 into engagement with contact 358, a closed circuit is established through improper addition relay CR5 and the associated indicator lamp 346. This closed circuit is provided by connected lines 360, switch connector 356, line 355, switch connector 354 and line 353.

If it is desired to add 15 to the X dimension, assuming this is possible, i.e. original number is not over 4, this is accomplished by throwing both switches SW10 and SW12.

The plus 5Y switch SW11 works with respect to solenoids S6–S9 the same way the plus 5X switch SW10 works with respect to solenoids S1–S4. Any of the solenoids S6–S9 in FIG. 20 is represented by the solenoid 106 in FIG. 2.

GENERAL OPERATION

There are three modes of operating the control console 26. These are automatic, manual and semi-automatic.

Automatic operation is determined by depressing push button 55. Both manual and semi-automatic operations are determined by depressing push button 56.

The output of the control console 26 can be directed in three ways, determined by the setting of a control knob 60. Thus, the output of the control console can be directed to the machine tool 21 only, or to the tape punch device 29 only, or to both.

If the mode of the console is automatic, the various mode selector levers 40, 44, 49 and 52 are in the "tape" position illustrated in FIG. 3. As shown in this figure, there are two coolant control knobs 368 and 369. These knobs 368 and 369 are shown in the "tape" position. In this mode, the console produces an output commanded solely by the reading of a tape which is effective by tape reader device 28. As previously indicated, such output can be directed solely to the machine tool 21, or to the tape punch device 29, or to both by the appropriate position of control knob 60.

When in this automatic mode, there will be a read cycle and a punch signal which occur substantially simultaneously followed by a machine cycle during which there is a tape advance cycle whereby the tape T being read is advanced. Reading of a block of information from the tape T will produce the necessary signals for controlling the various functions including position of the workpiece along the X and Y axes.

Assuming now that the console 26 is in a purely manual mode of operation, this means that no information is being read from an existing tape. This mode is achieved by depressing push button 56. The various mode selector levers 40, 44, 49 and 52 are first placed in their respective "set" positions in which the respective dial members 41, 43, 48 and 51 can be turned so as to set the appropriate number. Following this the mode selector levers 40, 44, 49 and 52 are placed in their respective "dial" positions which will lock the various dial members as previously set. As well, the coolant control knobs 368, 369 may be turned between their respective "on" and "off" positions depending upon the desired coolant function. Following the setting up of all of the manual information, the operator then depresses the "read" push button 58 and, if a tape is to be punched, also depresses the "punch" button 59. Depressing the latter will cause the appropriate holes to be punched in the new tape T′ by the tape punch device 29.

If the control console is in the semi-automatic mode of operation, the "manual" push button 56 will be depressed but there will be an existing tape T readable by the tape reader device 28. This semi-automatic mode enables certain of the information on the existing tape to be changed for the new tape by manually input information. For example, if each of the functions are to remain as on the existing tape except that the X and Y coordinates are to be changed, mode selector lever 40 will be shifted to the "set" position following which the various dial members 41 will be adjusted to set up the appropriate dimensions for the X and Y axes. When this has been completed, the lever 40 is shifted to the "dial" position which will lock the dial members 41. Thereafter, the operator will depress the read button 48 and the punch button 49. Insofar as the new tape T′ is concerned, it will be punched identically to the existing tape except for the X and Y coordinate information which will have been changed in accordance with that manually put in by the dial members 41. If desired each of the X and Y manual control means 38 and 39 may have its own mode selector lever akin to lever 40.

With regard to the tape punch device 29, the air supply to the various means 50, 42, 39, 45 and 113, shown in FIG. 2, will be turned on at the appropriate time so that the various punch signal conduits 84, 85, 86, 88, 89 and 90, also shown in FIG. 2, which are connected to the appropriate holes such as 282 and 284 of the device as shown in FIG. 12 will actuate the corresponding slide bars such as 249–252 to render the various back up means for the various punches ineffective as is commanded. Following this, pressurized air is introduced into chamber 211 for actuating toggle linkage 181. When toggle linkage 181 is actuated, the assembly of members 144, 141 and 156 is raised thereby elevating the tape T′ with respect to the various punches 134–136. As previously indicated, all of the sprocket drive hole punches 136 and the end of block hole punch 135 will punch their holes, whereas the punches 134 will punch holes in accordance with the binary encoded information represented by the presence or absence of pressure severally in the various conduits 282 and 284.

Energization of the electric motor 300 to rotate the Geneva cam 293 will be controlled to occur at the appropriate time.

From the foregoing, it will be seen that the embodiment illustrated and described achieves the various stated objects of the invention. Inasmuch as changes in construction and modifications may occur to those skilled in the art without departing from the spirit of the invention, the embodiment shown and described is illustrative and not limitative of the invention the scope of which is to be measured by the appended claims.

What is claimed is:

1. In apparatus for tape recording information including means providing a plurality of pneumatic signal conduits the respective pressures in which represent coded information, the combination therewith of tape punching means comprising support means for a tape, a plurality of punches one for each of said conduits, an individual back up rod for each of said punches, an individual bar for each of said rods and arranged at the remote end thereof and slidable transversely thereof and having a recess which is offset from said remote end when said bar is in a first position but which is adapted to receive said remote end when said bar is in a second position, and means for sliding said bar to said second position in response to pressure in the corresponding one of said conduits.

2. In apparatus for tape recording information including means providing a plurality of pneumatic signal conduits the respective pressures in which represent coded information, the combination therewith of tape punching means comprising support means for a tape, a plurality of punches one for each of said conduits, an individual back up rod for each of said punches, an individual bar for each of said rods and arranged at the remote end thereof and slidable transversely thereof and having a recess which is offset from said remote end when said bar is in a first position but which is adapted to receive said remote end when said bar is in a second position, spring means urging said bar toward said first position, and means for sliding said bar against the urging of said spring means to said second position in response to pressure in the corresponding one of said conduits.

3. In apparatus for tape recording information including means providing a plurality of pneumatic signal conduits the respective pressures in which represent coded information, the combination therewith of tape punching means comprising a die member, a guide member spaced from said die member to accommodate a tape in the space therebetween, said members having a plurality of alined holes, a plurality of punches one for each of said conduits and slidably arranged severally in the holes of said guide member, each of said punches including a shank and an enlarged head at one end of said shank and having its opposite end adapted to traverse said space and enter the respective one of said holes in said die member, means holding said punches in a retracted position relative to said die member including an extractor member having holes through which said punch shanks extend severally and engaging said punch heads on that side of said extractor member which is remote from said die and guide members, said holes in said extractor member being transversely larger than said punch shanks, individual back up means for said punches, means for rendering each of said back up means ineffective in response to pressure in the corresponding one of said conduits, flat spring means supporting said die and guide members for reciprocatory movement relative to said punches, and toggle linkage means for reciprocating said die and guide members toward and away from said extractor member whereby effectively backed up punches will penetrate the tape but ineffectively backed up punches will be displaced by the tape, said extractor member withdrawing from the tape during return movement of said die and guide members those of said punches which had penetrated the tape.

4. In apparatus for tape recording information including means providing a plurality of pneumatic signal conduits the respective pressures in which represent coded information, the combination therewith of tape punching means comprising a die member, a guide member spaced from said die member to accommodate a tape in the space therebetween, said members having a plurality of alined holes, a plurality of punches one for each of said conduits and slidably arranged severally in said holes of said guide member, means holding said punches in a retracted position relative to said die member, individual back up means for said punches and including a pusher rod at one end engaging the corresponding one of said punches, means for rendering each of said back up means ineffective in response to pressure in the corresponding one of said conduits, means for reciprocating said die and guide members toward and away from said punches whereby effectively backed up punches will penetrate the tape but ineffectively backed up punches with their respective pusher rods will be displaced by the tape, and means for returning those of said pusher rods which had been displaced including enlarged heads severally on said one ends of said pusher rods and an extractor member engaging that side of said heads remote from said punches and movable with said die and guide members.

5. In apparatus for tape recording information including means providing a plurality of pneumatic signal conduits the respective pressures in which represent coded information, the combination therewith of tape punching means comprising a die member, a guide member spaced from said die member to accommodate a tape in the space therebetween, said members having a plurality of alined holes, a plurality of punches one for each of said conduits and slidably arranged severally in said holes of said guide member, means holding said punches in a retracted position relative to said die member, individual back up means for said punches and including a pusher rod at one end engaging the corresponding one of said punches, said pusher rods being arranged in rows, means for rendering each of said back up means ineffective in response to pressure in the corresponding one of said conduits, means for reciprocating said die and guide members toward and away from said punches whereby effectively backed up punches will penetrate the tape but ineffectively backed up punches with their respective pusher rods will be displaced by the tape, and means for returning those of said pusher rods which had been displaced including enlarged heads severally on said one ends of said pusher rods, an extractor frame movable with said die and guide member and including elements extending transversely of said rows and provided with grooves and extractor bars having their ends arranged in said grooves and extending along opposite sides of said rows of pusher rods and engaging that side of said heads remote from said punches.

6. In apparatus for tape recording information including means providing a plurality of pneumatic signal conduits the respective pressures in which represent coded information, the combination therewith of tape punching means comprising support means for a tape, a plurality of punches one for each of said conduits and arranged in rows, individual back up means for those of said punches arranged in a given one of said rows and including a support having first grooves which are convergently directed toward said given row of punches, pusher rods severally slidably arranged in said first grooves and at one end engaging severally the punches in said given row, said support also having second grooves extending transversely of said first grooves, bars slidably severally arranged in said second grooves and each having a portion blocking one of said first grooves when such bar is in a first position and having a recess which is at such first groove when said bar is in a second position, the end remote from said punches of each of said pusher rods engaging the corresponding one of said bars when the latter is in its said first position but said recess receiving said remote end of such pusher rod when such bar is in its said second position, spring means urging each of said bars to its said first position, and means for sliding each of said bars to its said second position in response to pressure in the corresponding one of said conduits.

7. In apparatus for tape recording information including means providing a plurality of pneumatic signal conduits the respective pressures in which represent coded information, the combination therewith of tape punching means comprising support means for a tape, a plurality of punches one for each of said conduits and arranged in rows, individual back up means for those of said punches arranged in a given one of said rows and including a support plate having first grooves in one side thereof which are convergently directed toward said given row of punches, pusher rods severally slidably arranged in said first grooves and at one end engaging severally the punches in said given row, said support plate also having in said one side thereof second grooves in like number to said first grooves and extending transversely thereof, bars slidably arranged severally in said second grooves and having an inner end portion blocking one of said first grooves when such bar is in a first position and having a recess which is at such first groove to form an extension thereof when said bar is in a second position, the end remote from said punches of each of said pusher rods engaging the corresponding one of said bars when the latter is in its said first position but said remote end being receivable in said recess of such bar when the latter is in its said second position, the outer end portions of said bars extending outwardly from said support plate and terminating in outer ends alternately staggered, spring means urging each of said bars to its said first position, means producing individual diaphragms severally engaging said outer ends, and means establishing fluid conducting communication between each of said diaphragms and the corresponding one of said conduits.

8. In apparatus for tape recording information including means providing a plurality of pneumatic signal conduits the respective pressures in which represent coded information, the combination therewith of tape punching means comprising support means for a tape, a plurality of punches one for each of said conduits and arranged in rows, a first support plate associated with one of said rows and having in one side thereof first grooves directed toward said punches, said support plate also having in said one side thereof in a portion adjacent said punches second grooves in like number to said first grooves and extending transversely thereof, a second support plate associated with a second of said rows and arranged adjacent said first plate and having a first side covering said first and second grooves and a second side provided with third grooves directed toward said punches and fourth grooves in a portion remote from said punches in like number to said third grooves and extending transversely thereof, pusher rods severally slidably arranged in said first and third grooves and at one end engaging severally the punches in said one and second rows, first bars slidably arranged severally in said second grooves and each having an inner end portion blocking one of said first grooves when such bar is in a first position and having a recess which is at such first groove to form an extension thereof when such bar is in a second position, second bars slidably arranged severally in said fourth grooves and each having an inner end portion blocking one of said third grooves when such bar is in a first position and having a recess which is at such third groove to form an extension thereof when such bar is in a second position, the end remote from said punches of each of said pusher rods engaging the corresponding one of said bars when the latter is in its said first position but said remote end being receivable in said recess of such bar when the latter is in its said second position, the outer end portions of said first bars extending outwardly from one lateral side of said support plates and terminating in outer ends alternately staggered, the outer end portions of said second bars extending outwardly also from said one lateral side of said support plates and terminating in outer ends alternately staggered, spring means urging each of said bars to its said first position, means providing individual diaphragms severally engaging said outer ends, and means establishing fluid conducting communication between each of said diaphragms and the corresponding one of said conduits.

9. The apparatus for tape recording information including means providing a plurality of pneumatic signal conduits the respective pressures in which represent coded information, the combination therewith of tape punching means comprising support means for a tape, a plurality of punches one for each of said conduits and arranged in rows, first, second, third and fourth stacked support plates severally associated with a like number of said rows and each having first grooves directed toward said punches and also having second grooves in like number to its said first grooves and extending transversely thereof, said second grooves in said first and third plates being at an end of such plates adjacent said punches and said second grooves in said second and third plates being at an end of such plates remote from said punches, pusher rods severally slidably arranged in said first grooves and at one end engaging severally the punches in said like number of rows, first bars slidably arranged severally in said second grooves of said first and second plates, second bars slidably arranged severally in said second grooves of said third and fourth plates, each of said bars having an inner end portion blocking one of said first grooves when such bar is in a first position and having a recess which is at such first groove to form an extension thereof when such bar is in a second position, the end remote from said punches of each of said pusher rods engaging the corresponding one of said bars when the latter is in its said first position but said remote end being receivable in said recess of such bar when the latter is in its said second position, the outer end portions of said first bars extending outwardly from one lateral side of said plates and terminating in outer ends alternately staggered, the outer end portions of said second bars extending outwardly from the opposite lateral side of said plates and terminating in outer ends alternately staggered, spring means urging each of said bars to its said first position, means providing individual diaphragms severally engaging said outer ends, and means establishing fluid conducting communication between each of said diaphragms and the corresponding one of said conduits.

10. In apparatus for tape recording information including means providing a plurality of pneumatic signal conduits the respective pressures in each of which represents coded information, the combination therewith of tape punching means comprising support means for a tape, a plurality of punches selectively adapted to penetrate the tape, and means permitting individual back up for said punches including a housing member, a plurality of stacked plates one for each of said punches and arranged in said housing member, said plates being provided with first grooves directed toward said punches and second grooves extending transversely of said first grooves, pusher rods severally slidably arranged in said first grooves, bars slidable in said second grooves and operatively associated severally with said pusher rods and extending outwardly beyond the lateral edges of said plates, said bars including a first group thereof having their outer ends terminating at a first distance from one of said edges, a second group thereof having their outer ends terminating at a second distance from said one of said edges, a third group thereof having their outer ends terminating at a third distance from the other of said edges and a fourth group thereof having their outer ends terminating at a fourth distance from said other of said edges, a first inner cover plate arranged opposite said one of said edges and provided with holes receiving the outer end portions of said first group of bars and also provided with additional holes through which said second group of bars extends, a first intermediate cover plate arranged on said first inner cover plate and provided with holes receiving the outer end portions of said second group of bars, a first outer cover plate arranged on said first intermediate cover plate, a first diaphragm sheet arranged between said first inner cover plate and first intermediate cover plate, a second diaphragm sheet arranged between said first intermediate cover plate and first outer cover plate, a second inner cover plate arranged opposite the other of said edges and provided with holes receiving the outer end portions of said third group of bars and also provided with additional holes through which said fourth group of bars extends, a second intermediate cover plate arranged on said second inner cover plate and provided with holes receiving the outer end portions of said fourth group of bars, a second outer cover plate arranged on said second intermediate cover plate, a third diaphragm sheet arranged between said second inner cover plate and second intermediate cover plate, a fourth diaphragm sheet arranged between said second intermediate cover plate and second outer cover plate, said diaphragm sheets providing individual diaphragms severally engaging said outer ends, passage means provided in said intermediate and outer cover plates for establishing fluid conducting communication between each of said diaphragms and the corresponding one of said conduits, spring means arranged in said holes in said inner cover plates for urging said first and third groups of bars outwardly, and spring means arranged in said holes in said intermediate cover plates for urging said second and fourth groups of bars outwardly.

11. In apparatus for tape recording information, the combination comprising means providing command pneumatic signal conduits the respective pressures in which represent coded dimensional information, means for controlling the respective pressures in said command conduits, means providing punch pneumatic signal conduits in like number to said command conduits, means for punching tape in response to the respective pressures in said punch conduits, pressure reproducing means operatively interposed between corresponding pairs of said command and punch conduits, addition means for producing pressures severally in said punch conduits which represent the sum of a predetermined value and the coded dimensional information represented by the respective pressures severally in said command conduits, and selectively operable means for alternatively activating said pressure reproducing means and addition means.

12. In apparatus for tape recording information, the combination comprising means providing command pneumatic signal conduits the respective pressures in which represent binary coded information, means for controlling the respective pressures in said command conduits, means providing punch pneumatic signal conduits in like number to said command conduits, means for punching tape in respinse to the respective pressures in said punch conduits, pressure reproducing means operatively interposed between corresponding pairs of said command and punch conduits and including an on-off solenoid valve in each of said punch conduits and means for energizing said solenoid valve when a positive pressure exists in the corresponding one of said command conduits, addition means for producing pressures severally in said punch conduits which are binary coded and represent the sum of a predetermined value and the information represented by the respective pressures in said first conduits, and selectively operable means for alternatively activating said pressure reproducing means and addition means.

References Cited by the Examiner

UNITED STATES PATENTS

| | | | |
|---|---|---|---|
| 642,564 | 1/1900 | Kuster | 234—54 X |
| 734,729 | 7/1903 | Mertens | 234—111 |
| 1,567,681 | 12/1925 | Russen | 234—87 X |
| 1,667,742 | 6/1928 | Scheibel | 234—99 X |
| 2,372,887 | 4/1945 | Doty | 234—17 |
| 2,884,064 | 4/1959 | Doty et al. | 234—17 |
| 2,935,046 | 5/1960 | Panissidi | 234—87 X |
| 3,059,842 | 10/1962 | Wadley | 234—107 X |
| 3,071,317 | 1/1963 | Mills | 234—54 X |
| 3,122,039 | 2/1964 | Sowers | 234—107 X |

WILLIAM S. LAWSON, *Primary Examiner.*